(12) United States Patent
Shimizu et al.

(10) Patent No.: US 7,317,497 B2
(45) Date of Patent: Jan. 8, 2008

(54) ELECTRO-OPTICAL DEVICE AND ELECTRONIC APPARATUS

(75) Inventors: Yuichi Shimizu, Satama-cho (JP); Yasuji Yamasaki, Chino (JP); Takunori Iki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/598,731

(22) Filed: Nov. 14, 2006

(65) Prior Publication Data

US 2007/0058102 A1 Mar. 15, 2007

Related U.S. Application Data

(62) Division of application No. 10/690,270, filed on Oct. 22, 2003, now Pat. No. 7,193,663.

(30) Foreign Application Priority Data

Oct. 31, 2002 (JP) ............................. 2002-318544
Sep. 12, 2003 (JP) ............................. 2003-321789

(51) Int. Cl.
*G02F 1/1343* (2006.01)
*H01L 31/00* (2006.01)
*H01L 29/04* (2006.01)

(52) U.S. Cl. .................... 349/44; 349/139; 257/59; 257/72

(58) Field of Classification Search ............... 349/38, 349/44, 43, 139; 257/59, 72
See application file for complete search history.

(56) References Cited

U.S. PATENT DOCUMENTS

| | | | |
|---|---|---|---|
| 5,414,547 A | 5/1995 | Matsuo et al. | |
| 5,429,962 A | 7/1995 | Yang | |
| 5,546,204 A | 8/1996 | Ellis | |
| 5,563,727 A | 10/1996 | Larson et al. | |
| 5,966,193 A | 10/1999 | Zhang et al. | |
| 5,978,056 A | 11/1999 | Shintani et al. | |
| 6,075,580 A | 6/2000 | Kouchi | |
| 6,108,056 A | 8/2000 | Nakajima et al. | |
| 6,266,117 B1 | 7/2001 | Yanagawa et al. | |
| 6,292,246 B1 | 9/2001 | Shinohara et al. | |
| 6,521,913 B1 | 2/2003 | Murade | |
| 6,583,830 B2 | 6/2003 | Yasukawa et al. | |
| 6,608,658 B1 | 8/2003 | Tsujimura et al. | |
| 6,636,284 B2 | 10/2003 | Sato | |
| 6,781,651 B2 | 8/2004 | Song et al. | |
| 6,809,338 B2 | 10/2004 | Murade | |

(Continued)

FOREIGN PATENT DOCUMENTS

JP     A-58-46644     3/1983

(Continued)

*Primary Examiner*—Toan Ton
(74) *Attorney, Agent, or Firm*—Oliff & Berridge, PLC

(57) ABSTRACT

An electro-optical device includes, above a substrate: data lines extending in a first direction; scanning lines extending in a second direction and intersecting the data lines; pixel electrodes and thin film transistors disposed so as to correspond to intersection regions of the data lines and the scanning lines; storage capacitors electrically connected to the thin film transistors and the pixel electrodes; and shielding layers disposed between the data lines and the pixel electrodes. Further, nitride films are included in the shielding layers and are formed along the data lines and are wider than the data lines.

9 Claims, 17 Drawing Sheets

U.S. PATENT DOCUMENTS

| | | |
|---|---|---|
| 6,912,020 B2 | 6/2005 | Kawata |
| 6,952,243 B2 | 10/2005 | Kawata |
| 2002/0060756 A1 | 5/2002 | Kurashina |
| 2004/0085497 A1* | 5/2004 | Kawata ................. 349/111 |

FOREIGN PATENT DOCUMENTS

| | | |
|---|---|---|
| JP | A-02-251172 | 10/1990 |
| JP | A-04-022127 | 1/1992 |
| JP | A-05-129333 | 5/1993 |
| JP | A-5-206082 | 8/1993 |
| JP | A-06-148684 | 5/1994 |
| JP | A-6-295924 | 10/1994 |
| JP | A-07-294960 | 11/1995 |
| JP | A-8-306902 | 11/1996 |
| JP | A-9-232426 | 9/1997 |
| JP | A-10-039336 | 2/1998 |
| JP | A-10-242268 | 9/1998 |
| JP | A-10-307305 | 11/1998 |
| JP | A-11-064891 | 3/1999 |
| JP | A-11-087498 | 3/1999 |
| JP | A-11-281971 | 10/1999 |
| JP | A-2000-010120 | 1/2000 |
| JP | A-2001-066638 | 3/2001 |
| JP | A-2001-133810 | 5/2001 |
| JP | A-2001-265253 | 9/2001 |
| JP | A-2001-356709 | 12/2001 |
| JP | A-2002-057341 | 2/2002 |
| JP | A-2000-094072 | 3/2002 |
| JP | A-2002-090721 | 3/2002 |
| JP | A-2002-122857 | 4/2002 |
| JP | A-2002-131778 | 5/2002 |
| JP | A-2002-156652 | 5/2002 |
| JP | A-2002-158360 | 5/2002 |
| KR | A-2001-0033465 | 4/2001 |
| WO | WO 01/81994 A1 | 11/2001 |
| WO | WO 01/82273 A1 | 11/2001 |

* cited by examiner

F I G. 5
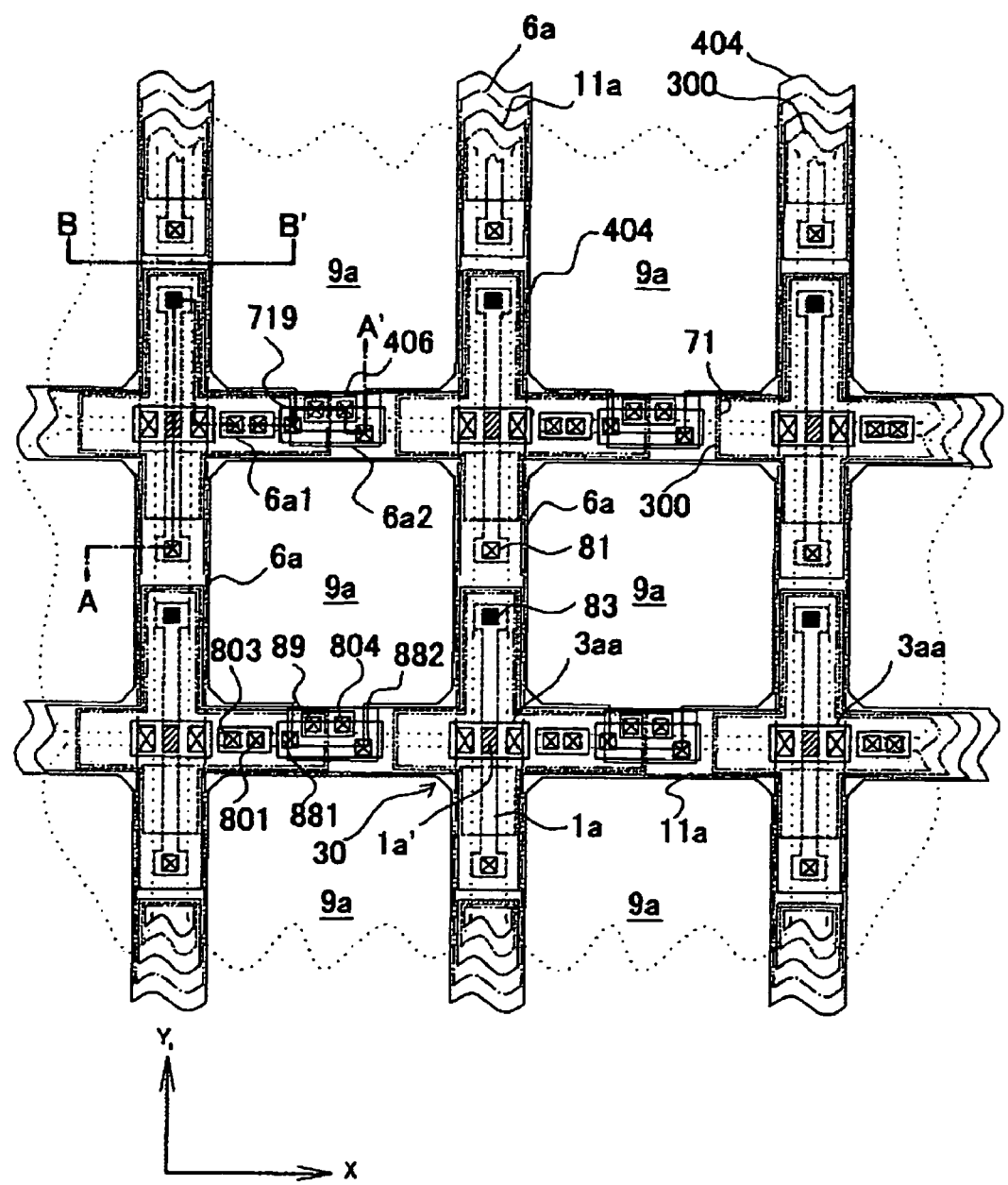

ELECTRO-OPTICAL DEVICE AND ELECTRONIC APPARATUS

This is a Division of application Ser. No. 10/690,270 filed Oct. 22, 2003 now U.S. Pat. No. 7,193,663, which claims the benefit of Japanese Patent Applications Nos. 2002-318544 and 2003-321789 filed Oct. 31, 2002 and Sep. 12, 2003, respectively. The disclosure of the prior application is hereby incorporated by reference herein in its entirety.

BACKGROUND OF THE INVENTION

1. Field of Invention

The present invention relates to electro-optical devices, such as liquid crystal devices and electronic apparatuses. The present invention also relates to an electrophoresis device, such as an electronic paper, an EL (electroluminescent) device, and a device using an electron emission element (a field emission display and a surface-conduction electron-emitter display).

2. Description of Related Art

In the related art, an electro-optical device, such as a liquid crystal device capable of displaying an image, in which an electro-optical material, such as liquid crystal is interposed between a pair of substrates and light is transmitted so as to pass through the substrates and the electro-optical material, is disclosed. "Displaying the image", for example, is realized by changing the state of an electro-optical material in each pixel to change the transmittance ratio of light and by causing light with different gray scales to be sensed in each pixel.

Such an electro-optical device is active-matrix driven by including, on one of the pair of substrates, pixel electrodes arranged in a matrix, scanning lines and data lines positioned to thread through the pixel electrodes, and TFTs (thin film transistors) as pixel switching elements. In the electro-optical device capable of being active-matrix driven, the TFTs are provided to control conduction between the pixel electrodes and the data lines. Further, the TFTs are electrically connected to the scanning lines and the data lines. Therefore, it is possible to control the on or off of the TFTs through the scanning lines and to apply image signals received through the data lines to the pixel electrodes. For example, to change the transmittance ratio of light in each pixel when the TFTs are turned on.

In the above-mentioned electro-optical device, the above-mentioned various components are formed on one substrate. However, when the components are expanded two-dimensionally, the components occupy a large area. Therefore, a pixel aperture ratio, that is, a ratio of a region through which light passes to the entire surface of the substrate may decrease. Therefore, in the conventional art, a method of forming the above-mentioned various components three-dimensionally. For example, a method of laminating the various components by interposing interlayer insulating layers is adopted. More specifically, the TFTs and the scanning lines, functioning as gate electrode films of the TFTs, are formed on the substrate. The data lines are formed on the TFTs and the scanning lines. The pixel electrodes are formed on the data lines. According to such a configuration, it is possible to enhance the pixel aperture ratio by appropriately arranging the various elements as well as to miniaturize the electro-optical device.

However, the related art electro-optical device has the following problems. According to the above-mentioned electro-optical device, the pixel electrodes and the data lines may be two-dimensionally or three-dimensionally formed to be close to each other in relatively narrow regions. However, in the above case, capacitance coupling may be generated between the pixel electrodes and the data lines. For example, once a voltage is applied, in a predetermined period, the potential of the pixel electrodes, which is supposed to be uniform, may change due to the conduction to the data lines close to the pixel electrodes. Therefore, stripe-shaped display irregularity along the data lines may be generated on an image.

Further, it matters that the life of the TFTs is relatively short. This is because positive charges are generated due to the diffusion of water molecules to the interface between the gate-insulating film and the semiconductor layer when moisture enters the semiconductor layer and the gate insulating film, which constitute the TFTs, thereby to increase a threshold voltage Vth in a relatively short period. Such a phenomenon is more appropriately applied to a P-channel TFT. As mentioned above, when the life of the TFTs is relatively short, the entire electro-optical device is affected and the quality of an image deteriorates at a relatively early stage. As a result, the electro-optical device itself may not operate.

Furthermore, in the above-mentioned laminated structure, in general, the pixel electrodes are formed in the uppermost layer and the TFTs are formed in the lowermost layer. Therefore, in order to electrically connect the pixel electrodes to the TFTs, another layer and a contact hole, which constitute the laminated structure, are interposed between the pixel electrodes and the TFTs. However, in such a case, for example, when it is desired to connect a transparent conductive material, such as ITO (indium tin oxide) which constitutes the pixel electrode to the above-mentioned layer, that is, an aluminum layer, electrolytic erosion occurs. Therefore, electric conduction between the transparent conductive material and the aluminum layer may deteriorate.

SUMMARY OF THE INVENTION

The present invention has been made to address the above problems. The present invention provides an electro-optical device capable of displaying an image with higher quality by reducing or preventing the capacitance coupling generated between pixel electrodes and data lines from affecting the electro-optical device, prolonging the life of TFTs, and realizing excellent electric connection among the respective elements which constitute the laminated structure. Further, the present invention provides an electronic apparatus including the electro-optical device.

The electro-optical device according to an aspect of the present invention includes, above a substrate: data lines extending in a first direction; scanning lines extending in a second direction and intersecting the data lines; pixel electrodes and thin film transistors disposed so as to correspond to intersection regions of the data lines and the scanning lines; storage capacitors electrically connected to the thin film transistors and the pixel electrodes; and shielding layers disposed between the data lines and the pixel electrodes. Further, nitride films are included in the shielding layers and are formed along the data lines and wider than the data lines.

First, the electro-optical device of an aspect of the present invention can be driven in an active matrix by including the scanning lines, the data lines, the pixel electrodes, and the thin film transistors. Furthermore, in the above electro-optical device, it is possible to achieve miniaturization of the whole apparatus by including the aforementioned various constituents as some portions of the laminated structure, and it is possible to enhance the pixel aperture ratio by arranging the various constituent appropriately.

Moreover, in the present invention, other than the aforementioned various constituents, particularly the storage capacitors, the shielding layers, and the interlayer insulating films are provided as the constituents of the laminated structure.

First, because the shielding layer is interposed between the data lines and the pixel electrodes, it is possible to reduce or prevent the capacitance coupling from occurring between the data lines and the pixel electrodes. That is, it is possible to reduce a possibility of causing a change in potential in the pixel electrodes due to the conduction of the data lines and thereby to display an image with higher quality.

Furthermore, in the present invention, a nitride film that reduces or prevents the permeation and diffusion of moisture is included in the shielding layer. Therefore, it is possible to reduce or prevent moisture from permeating the semiconductor layer of the thin film transistor to the utmost and thereby to reduce or prevent the threshold voltage of the thin film transistor from increasing. As a result, it is possible to prolong the life of the electro-optical device.

Second, the shielding layers are formed along the data lines and wider than the data lines.

According to the above aspect, it is possible to reduce or exclude the influence of the capacitance coupling between the data lines, which are formed along the shielding layers, and the pixel electrodes. That is, the problems described in the background of the invention are reduced or do not occur, at least between the data lines and the pixel electrodes. Therefore, according to the present aspect, it is possible to reduce or prevent the transmittance ratio from deteriorating due to the shielding layers and thereby to effectively obtain the above-mentioned effects.

In the above aspect, particularly, the data lines formed along the shielding layers include the data lines on both ends of the corresponding group among groups of the data lines, to which image signals are simultaneously supplied.

According to the above configuration, in the aspect where data lines are divided into several groups and image signals are simultaneously supplied to each group, the shielding layers are formed in the data lines most desired not to be affected by the capacitance coupling. Therefore, it is possible to more effectively enhance the quality of an image. That is, in the above-mentioned case, it is possible to reduce or prevent the display irregularity from being generated along the data lines extending on the boundaries between the group, to which image signals are actually supplied (hereinafter, referred to as a "supplied group") and the group adjacent thereto (hereinafter, referred to as a "non-supplied group"). This is because the electric field exactly corresponding to the image signal is not applied to the pixel electrode on the boundary between the supplied group and the non-supplied group in many cases. More specifically, in the above case, the data line, to which the image signal is supplied, exists on one end of the pixel electrode and the data line, to which the image signal is not supplied, exists on the other end of the pixel electrode. Therefore, even if the electric field exactly corresponding to the image signal is applied to the pixel electrode, the potential of the pixel electrode changes due to the influence of the capacitance coupling between the pixel electrode and the data line to which the image signal is not supplied.

Further, "the group of the data lines, to which the image signals are simultaneously supplied," for example, the group of the data line making up one group, is determined by how many parallel signals form the image signals. For example, when it is assumed that the image signals are obtained by serial-parallel converting serial signals into six parallel signals, the group of the data lines include six adjacent data lines. In the above case, first and sixth data lines correspond to "the data lines positioned on both ends of the group". Further, according to an aspect of the present invention, it is preferable that the dielectric film which constitutes the storage capacitor be a laminated structure including a plurality of layers made of different materials, in which one among the layers is made of a material having a higher dielectric constant than the other layers.

According to the above configuration, the storage capacitor in accordance with an aspect of the present invention has further excellent charge storage characteristics in comparison to the related art, and by doing so, it is possible to further enhance the charge storage characteristics of the pixel electrodes. As a result, it is possible to display images with higher quality. In addition, "high dielectric constant material" referred in the present invention includes an insulating material which is made of at least one of the group consisting of TaOx (tantalum oxide), BST (barium strontium titanate), PZT (lead zirconate titanate), $TiO_2$ (Titanium dioxide), $ZiO_2$ (zirconium dioxide), $HfO_2$ (hafnium dioxide), and SiON (silicon oxynitride) other than the below-described SiN (silicon nitride). In particular, by using a refractory material, such as TaOx, BST, PZT, $TiO_2$, $ZiO_2$, and $HfO_2$, it is possible to increase the capacitance value on the limited area on the substrate. Otherwise, by using a material including silicon, such as $SiO_2$ (silicon dioxide), SiON (silicon oxynitride), and SiN, it is possible to reduce the occurrence of the stress in the interlayer insulating films, etc.

In an aspect of the electro-optical device of the present invention, a planarization process is performed on the surfaces of interlayer insulating films arranged as the bases of the pixel electrodes.

According to the above aspect, the interlayer insulating films are formed below the pixel electrodes, and the surfaces of the interlayer insulating films are planarized by, for example, CMP (chemical mechanical polishing) process, etc. By doing so, it is possible to reduce the probability of the occurrence of disorder of the alignment state of the electro-optical material such as liquid crystals, etc., and thus, it is possible to display images with higher quality.

In another aspect of the electro-optical device of the present invention, each of the data lines is formed of the same film as one of a pair of electrodes which constitute each of the storage capacitors.

According to the above aspect, each data line and one electrode in a pair of electrodes which constitute each of the storage capacitors are made of the same film. For example, formed on the same layer, or formed in the same manufacturing process. By doing so, it is not necessary to provide both of each of the data lines and one electrode on separate layers and to separate them by interlayer insulating films. Thus, it is possible to avoid a highly laminated structure. At this point, the present invention is advantageous in that the laminated structure includes the shielding layers formed between the data lines and the pixel electrodes, and thus, a highly laminated structure which has an altitude increase is expected. The reason for such an advantage is that, excessively multi-layered structure obstructs easy manufacturing or high manufacturing yield. In addition, even though the data lines and the one electrode of a pair of the electrodes are formed at the same time, by an appropriate patterning process on the aforementioned films, it is possible to facilitate the insulation between them, and no particular problem occurs with respect to this point.

In addition, as apparent from the description of the aspect, in the present invention, it is not always necessary to form each of the data lines and the one electrode of a pair of electrodes which constitute each of the storage capacitor as the same film. In other words, they may be separately formed in the different layers.

In the above aspect, particularly, it is preferable that the data lines include a laminated body of an aluminum film and a conductive polysilicon film.

According to the above configuration, it is possible to establish electrical connection between the data lines and the thin film transistors by contacting the conductive polysilicon film which constitute the data lines with the semiconductor layers which constitute the thin film transistors, so that a good electrical connection between them can be obtained.

In another aspect of the electro-optical device according to the present invention, the electro-optical device may include relay layers, as parts of a laminated structure, to electrically connect each of the pixel electrodes to one of a pair of electrodes which constitute each of the storage capacitors.

According to the above aspect, the one electrode of a pair of electrodes of each of the storage capacitor and the pixel electrodes, which constitute some portions of the laminated structure, respectively, are electrically connected to the relay layer which constitutes some portions of the laminated structure. Concretely, the connection is achieved by the formation of a contact hole. By doing so, for example, the relay layers according to an aspect of the present invention are formed of a two-layered structure, while the upper layer is made of a material which is very compatible with ITO (Indium Tin Oxide) as an example of a transparent conductive material which is generally used as a material of the pixel electrode and the lower layer is made of a material which is compatible with one electrode of a pair of electrodes which constitute each of the storage capacitor. Like this, since the relay layer can employ such a flexible configuration, it is possible to further suitably implement the application of voltage to the pixel electrodes or the potential holding in the pixel electrodes.

In the above aspect, particularly, it is preferable that the relay layers include an aluminum film and a nitride film.

In accordance with the configuration, in a case wherein the pixel electrodes include, for example, ITO, if the ITO and the aluminum are directly contacted, electrical erosion occurs between them, and thus, the disconnection of the aluminum or the insulation due to occurrence of alumina occurs. This is not desirable. Therefore, in the above aspect, the ITO does not directly contact the aluminum. But the ITO does contact a nitride film, for example, a titanium nitride film, so that it is possible to establish electrical connection to the storage capacitors as well as the pixel electrodes and the relay layer. This configuration provides an example of the aforementioned "well-compatible material".

Further, since the nitride has an excellent function of reducing or preventing water from permeating or diffusing, as described above with respect to the dielectric films constituting the aforementioned storage capacitors, it is possible to reduce or prevent water from permeating the semiconductor layers which constitute the thin film transistors in advance. In the above aspect, since the relay layers include the nitride, it is possible to obtain the aforementioned functions, and thus, it is possible to reduce or prevent the occurrence of the problem to the utmost in that the threshold voltage of the thin film transistors greatly increase.

Further, in an aspect that the relay layers are provided, it is preferable that the shielding layers be formed of the same film as the relay layers.

In the configuration according to the above aspect, since the relay layers and the shielding layers are formed of the same film, both constituents can be formed at the same time, so that it is possible to facilitate simplification of the manufacturing process or to lower manufacturing cost as much as that.

In another aspect in which the configuration according to the above aspect combines with the aforementioned aspect, in that the data lines and the one electrode of a pair of electrodes which constitute each of the storage capacitor are formed of the same film, the arrangement of the data lines, the storage capacitors, the relay layers, and the pixel electrodes, particularly, the laminating order, etc., becomes preferable, so that it is possible to further effectively obtain the aforementioned functions and effects.

Furthermore, particularly, in another aspect in which the configuration according to the above aspect combines with the configuration that the relay layers include the nitride film, the shielding layers also include the nitride films. Therefore, it is possible to further obtain the water permeation preventing function on the semiconductor layers of the thin film transistors over the surface of the substrate as described above. Accordingly, it is possible to further effectively obtain the function and effect of the long-term maintenance of the thin film transistor.

In addition, as apparent from the description of the above aspect of the present invention, it is not always necessary to form the shielding layers and the relay layers as the same film. In other words, they may be separately formed in the different layers.

In another aspect of the electro-optical device of the present invention, the nitride films are formed on the surfaces of the data lines.

According to the above aspect, the nitride films that reduce or prevent the permeation and diffusion of moisture are formed on the surfaces of the data lines. Thus, it is possible to the utmost, to reduce or prevent moisture from permeating the semiconductor layer of the thin film transistor due to an excellent function of the nitride film of reducing or preventing moisture from permeating or diffusing. Therefore, it is possible to reduce or prevent the threshold voltage of the thin film transistor from increasing. As a result, it is possible to prolong the life of the electro-optical device.

Further, when the nitride film is formed only on the surface of the data line, it is possible to reduce stress inside the nitride film, as is apparent by a comparison with the case where the nitride film is formed over the entire surface of the substrate. Therefore, it is possible to reduce or prevent the nitride film itself from being destroyed by the stress thereof in advance. Further, it is possible to reduce or prevent the generation of crack in the other structures around the nitride film, for example, the interlayer insulating film due to the operation of the stress to the outside in advance.

Furthermore, in the present aspect, it is preferable that the nitride film be included in the shielding layer and on the surface of the data line. In the above case, because the semiconductor layer of the thin film transistor is located under the two-layer nitride film, it may be possible to reliably reduce or prevent moisture from permeating the semiconductor layer.

A silicon nitride film (a SiN film, a SiON film, etc.) or a titan nitride film (a TiN film) is used as the "nitride film"

referred in the present invention. It is needless to say that other films can be used as the nitride film.

In order to achieve the above objects, another electro-optical device of an aspect of the present invention includes, on a substrate: data lines extending in a first direction; scanning lines extending in a second direction and intersecting the data lines; pixel electrodes and thin film transistors disposed so as to correspond to intersection regions of the data lines and the scanning lines; storage capacitors electrically connected to the thin film transistors and the pixel electrodes; and shielding layers disposed between the data lines and the pixel electrodes. Further, nitride films are included in the data lines.

According to another electro-optical device of an aspect of the present invention, particularly, because the nitride film is included in the data line, it is possible to reduce or prevent the permeation of moisture and to obtain high reliability without cracks and the like, as mentioned above concerning the aspect where the nitride film is formed on the surface of the data line.

In the aspect where the nitride film is formed on the data line, particularly, the nitride film is preferably formed on the scanning line.

According to the above configuration, the nitride film extends in both the first and second directions. Therefore, it is possible to reduce or prevent the permeation of moisture more reliably. In the above case, because the nitride film is commonly latticed, the nitride film does not exist on the pixel electrode. Therefore, it is possible to maintain the transparency, for example, the light transmittance ratio of the electro-optical device. As a result, according to the present aspect, it is possible to prolong the life of the electro-optical device due to the presence of the nitride film and nevertheless to provide an image with higher quality and brightness. Furthermore, according to the research of the present inventor, when the nitride film remains over the entire surface of the substrate, the transmittance ratio of the electro-optical device is reduced by about 4% compared with the case where the nitride film is not formed on the substrate.

In the aspect where the nitride films are formed on the data lines, the nitride films are formed around image display regions defined by regions where the pixel electrodes, the data lines, and the scanning lines are formed.

According to the above configuration, because the nitride films are formed around the image display regions, it is possible to reduce or prevent the permeation of moisture more reliably. In particular, when a data line driving circuit and a scanning line driving circuit to drive the data lines and the scanning lines, respectively, are formed around the image display region and the driving circuits are built in the substrate, a plurality of thin film transistors as switching elements are commonly included in the built-in driving circuits. Therefore, the nitride film formed around the image display region contributes to prolonging the life of the plurality of thin film transistors.

In addition, as confirmed by the present inventor, according to the aspect where the nitride film is formed only around the image display region and on the surface of the data lines, it is possible to prolong the lives of the thin film transistors and the electro-optical device about three times those of the thin film transistors and the electro-optical device according to the related art. Therefore, according to the present aspect, it is possible to effectively reduce or prevent moisture from permeating the TFTs by using the required minimum amount of nitride film.

Further, when the nitride film is formed around the image display region, it is possible to make surface unevenness inside the image display region almost the same as that outside the image display region. For example, it is possible to uniformly planarize the surface of the laminated structure on the substrate.

In the aspect where the nitride films are formed on the data lines, preferably, the nitride films formed on the data lines are wider than the data lines.

According to the above configuration, it is possible to reduce or prevent the data lines from being damaged during processes of manufacturing the electro-optical device.

For example, in the case where the nitride film according to an aspect of the present invention is formed only on the data line, a manufacturing method using photolithography is typically applied. According to the photolithography, an original film as the nitride film is formed on the entire substrate. Then, a resist having a predetermined pattern (a pattern of coating only the data lines) is formed. Subsequently, the resist and the original film are etched. However, according to the above method, because the etching process and the resist peeling process are included, the data lines may be damaged during the processes.

In the present aspect, because the nitride film is formed wider than the data line, only the edges of the nitride film are damaged by etching. Therefore, it is possible to suppress the damage to the data lines to a minimum.

As a result, it is possible to guarantee the stable operation of the electro-optical device and to display an image with higher quality.

In the structure where the nitride film is wider than the data line, preferably, the edges of the nitride film are larger than the edges of the data lines by 0.1 to 2.2 µm. According to the above configuration, the width of the nitride film is appropriately determined for the width of the data line. It is possible to more reliably reduce or prevent the data lines from being damaged.

In the aspect where the nitride film is formed on the data line, preferably, the thickness of the nitride film is 10 to 100 nm.

According to the above configuration, the thickness of the nitride film is appropriately determined. Therefore, it is possible to reduce or prevent the nitride film from being affected by the stress.

Further, when the thickness of the nitride film is determined relatively small as mentioned above, the following effects are obtained. That is, when components, such as elements and wiring lines, are formed on the substrate and the interlayer insulating film is formed on the region where the components are formed and the other regions, a step difference is generated on the surface of the interlayer insulating film and the like. This is because the respective components have unique heights. When the step difference is generated, the alignment film commonly provided in the electro-optical device, such as a liquid crystal device, is unevenly coated or the alignment film cannot be appropriately rubbed. As a result, deterioration of the quality of an image such as deterioration of contrast is caused.

In the present aspect, the thickness of the nitride film is limited to about 10 to 100 nm, which is relatively small. Therefore, it is possible to reduce the step difference and thereby to reduce a possibility of deteriorating contrast or the like.

In the aspect where the nitride film is formed on the data line, preferably, the other substrate that faces the substrate with an electro-optical material interposed therebetween and a light-shielding film formed on the other substrate and positioned to correspond to the scanning lines and the data lines are further included. The nitride film is formed narrower than the light-shielding film.

According to the above configuration, the nitride film is narrower than the light-shielding film. That is, as viewed in plan, the nitride film is covered with the light-shielding film. The light-shielding film is for the purpose of preventing disturbance of light among pixels and thereby enhancing the contrast of an image and is commonly disposed not to transmit light. Therefore, when the nitride film is formed so as to be covered with the light-shielding film, it is possible to appropriately maintain the light transmittance ratio of the electro-optical device.

Furthermore, in the present aspect, preferably, the light-shielding film is positioned on the "other substrate". However, the present invention is not limited thereto. For example, the other light-shielding film disposed on the substrate (not the other substrate) may be used instead of the light-shielding film according to the present aspect. In the above case, as mentioned above, the TFTs, the storage capacitors, the scanning lines, the data lines, and the interlayer insulating films to partition them are formed on the substrate. However, the other light-shielding film may be considered as forming a part of the respective components and as forming an embedded light-shielding film by being interposed between the interlayer insulating films.

In particular, it is needless to say that the present aspect can be applied to the electro-optical device including the light-shielding film formed on the other substrate and the other light-shielding film formed on the substrate.

In the above aspect, particularly, the edges of the nitride films are narrower than the edges of the light-shielding films by 1 μm or less. According to the above configuration, the width of the nitride film is appropriately determined for the width of the light-shielding film. Therefore, it is possible to maintain the transmittance ratio of the electro-optical device.

In the aspect where the nitride film is formed on the data line, preferably, the other substrate that faces the substrate with the electro-optical material interposed therebetween and light-shielding films formed on the other substrate and positioned to correspond to the scanning lines and the data lines are further included. The nitride film is wider than the light-shielding film.

According to the above configuration, it is possible to reduce flicker on an image. This is because the incident light that passes through the side of the light-shielding film is refracted by the refractive index unique to the nitride film, which is not apparent. That is, light incident on the relatively wider part of the nitride film is refracted by the part thereby to change the traveling path thereof. Therefore, light supposed to be incident on the thin film transistors reaches other components. Thus, according to the present aspect, it is possible to reduce the amount of light incident of the thin film transistors and to reduce light leak current. As a result, it is possible to reduce the flicker.

Furthermore, from the above viewpoint, it is considered better that the nitride film be wider. However, when the nitride film is excessively wide, the nitride film is caught in the light transmission region. Therefore, the light transmittance ratio of the electro-optical device is reduced. As a result, the quality of an image may deteriorate. Therefore, the degree, to which the nitride film is wider than the light-shielding film, is limited from the above-mentioned viewpoint. More specifically, the distance from one edge of the light-shielding films to one edge of the nitride films is preferably about 1.7 μm.

Further, it is needless to say that the effect of the present aspect is obtained according to the aspect where the nitride film is wider than the data line. In the above case, the refracted light in the detailed description is referred to as "light that passes through the side of the data line".

In another aspect of the electro-optical device of the present invention, the shielding layer is made of a transparent conductive material in a mat shape formed over the entire surface of the substrate.

According to the above aspect, since the shielding layers are formed in a mat shape over the entire surface of the substrate, it is possible to further reduce or eliminate the influence of the capacitance couplings which occur between the data lines and the pixel electrodes. Furthermore, even though the shielding layers are formed in a mat shape, since the shielding layers are made of the transparent conductive materials such as, for example, ITO or IZO (indium zinc oxide), etc., any particular hindrance does not occur on the light transmission in the electro-optical device.

In addition, in a case wherein the shielding layers are formed in a mat shape as the above aspect, in order to correspond to the formation of the contact holes which electrically connect the pixel electrodes to the thin film transistors, it is preferable that the shielding layers include apertures which are formed at the positions where the contact holes are formed. By doing so, since it is possible to easily form the contact holes, it is possible to implement the electrical connection between the aforementioned various constituents which constitute the electro-optical device according to an aspect of the present invention. In addition, for the "aperture" referred herein, it is not necessary to form the aperture very accurately. In other words, since the "aperture" will suffice if the contact holes penetrate thereto, it is not necessary to pay particular attention to the aperture in the manufacturing process. However, even in a case wherein the shielding layers are formed in a mat shape over the entire surface of the substrate, it is preferable to include the aforementioned "relay layers" which are formed of the same film as the shielding layers, and in this case, the "aperture", which is to penetrate the contact holes, is not necessary. However, since it is necessary to facilitate electrical insulation between the shielding layers (fixed potential) and the relay layers (potential of pixel electrodes), although the patterning for forming the "aperture" is not necessary, the patterning for forming the "relay layer" is necessary. The "mat shape" referred in the aspect includes the following cases.

Like the present aspect, in a case wherein the shielding layers are formed over the entire surface, it is preferable that the thickness of the shielding layers be about 50 to 500 nm. By doing so, the thickness of the shielding layer is sufficient to eliminate the influence of the capacitance couplings, and also, is restricted to a range appropriate to sustain the transparency of the whole electro-optical device.

In the various aspects of the present invention, it is possible to freely combine one aspect with another aspect. However, there are some cases that combination of some aspects may be not compatible. For example, the combination of a configuration where the shielding layers are made of a transparent conductive material with a configuration where the data lines are formed of the same film as one electrode of a pair of electrodes which constitute each of the storage capacitors, is not compatible. Of course, the electro-optical device may be constructed by combination of three or more configurations.

In order to achieve the aforementioned object, the electronic apparatus of the present invention includes the aforementioned electro-optical device of the present invention.

In accordance with the electronic apparatus of the present invention, since the electronic apparatus includes the electro-optical device of an aspect of the present invention, the influence of the capacitance coupling, which occurs between the data lines and the pixel electrodes, is reduced or prevented and a good electrical connection between components, which constitute the laminated structure, is realized. As a result, it is possible to implement various types of electronic apparatuses capable of displaying images with high quality, such as a projection type display apparatus (liquid crystal projector), a liquid crystal television set, a mobile phone, an electronic diary, a word processor, a viewfinder type or monitor-direct-viewing type video tape recorder, a workstation, a television telephone, a POS terminal, a touch panel, etc.

These functions and the other advantages of the present invention will be clarified by the exemplary embodiments described below.

BRIEF DESCRIPTION OF THE DRAWINGS

FIG. 5 is for the same purpose as FIG. 2 illustrating the second exemplary embodiment of the present invention and illustrates another aspect where the structures of the shielding layers and the data lines are different from those of FIG. 2;

DETAILED DESCRIPTION OF PREFERRED EMBODIMENTS

Now, the preferred exemplary embodiments of the present invention will be described with reference to the drawings. The following exemplary embodiment is an electro-optical device according to the present invention which is applied to a liquid crystal apparatus.

First Exemplary Embodiment

Figure 1:
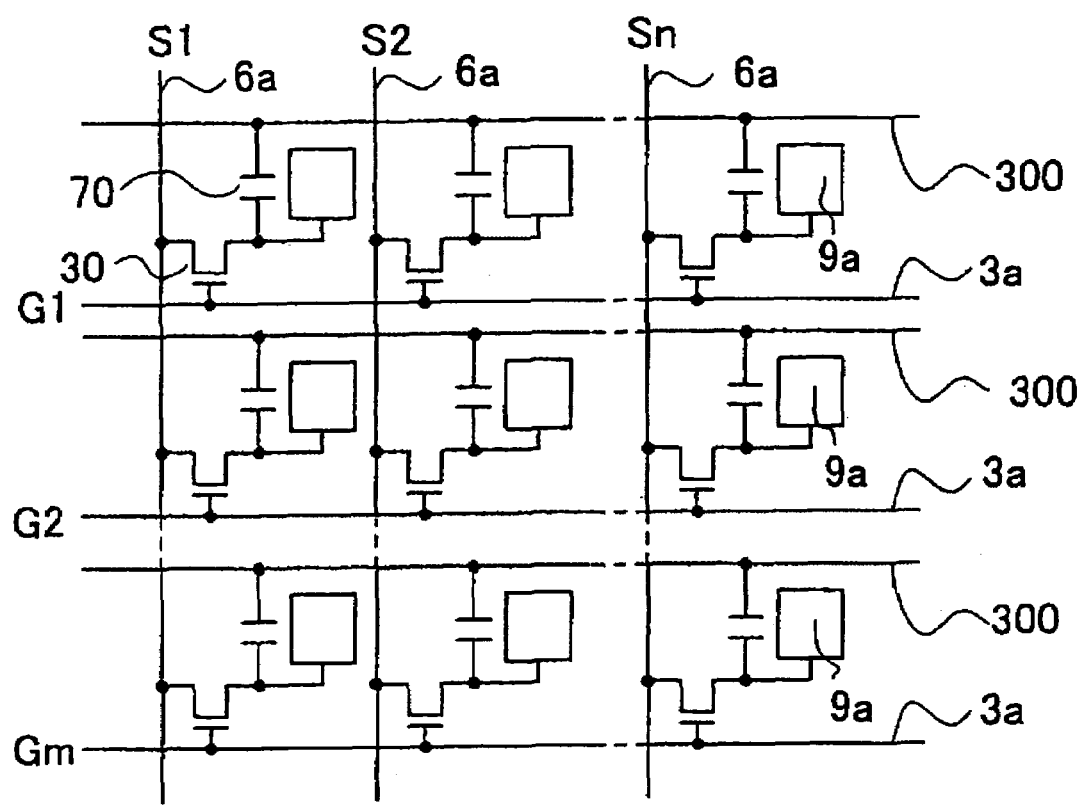
FIG. 1 a circuit schematic illustrating an equivalent circuit of various elements and wiring lines which are provided in a plurality of pixels having a matrix shape which constitutes image display regions in an electro-optical device according to an exemplary embodiment of the present invention.
Figure 2:
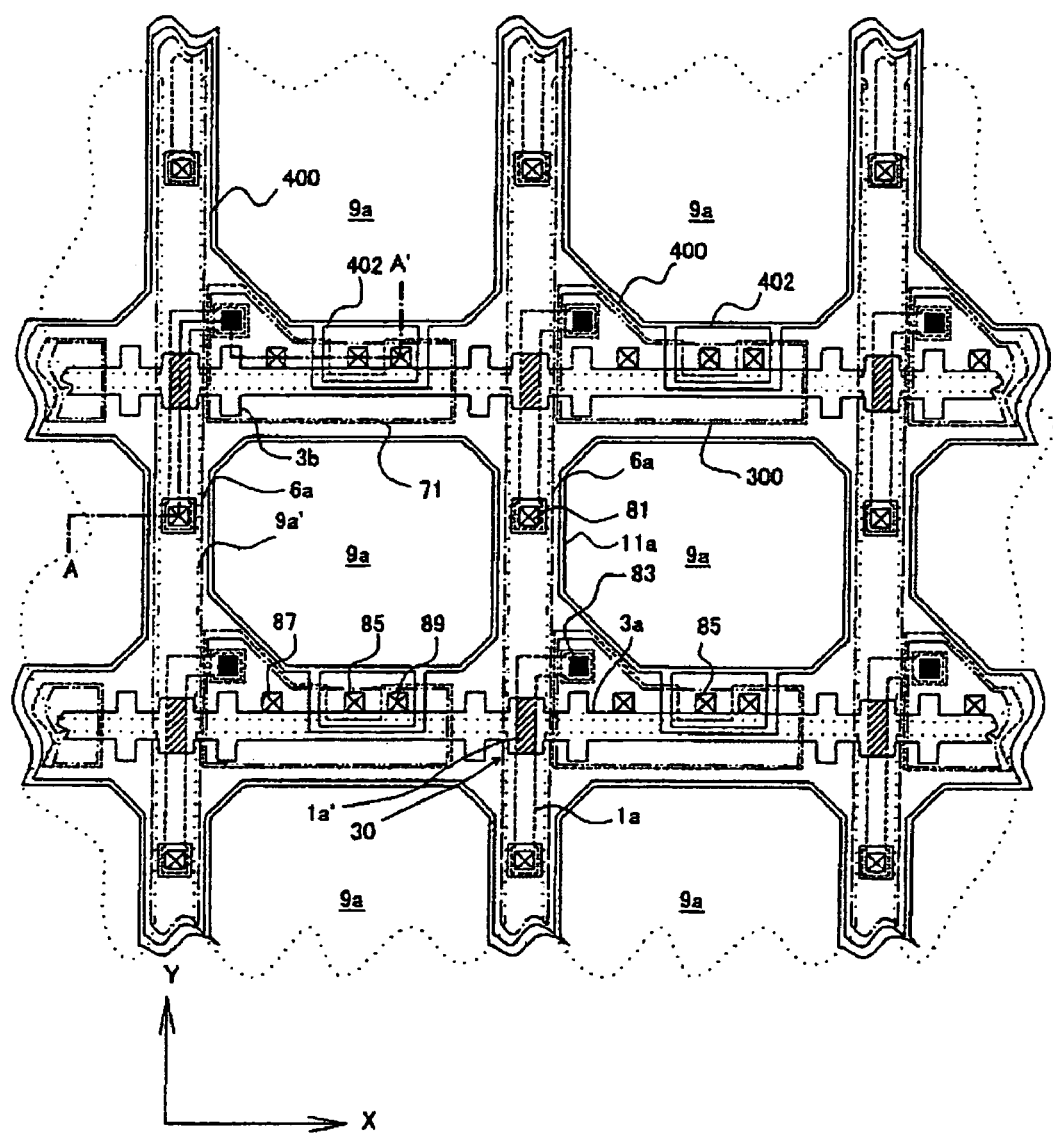
FIG. 2 is a plan view illustrating a plurality of pixel groups which are adjacent to each other on a TFT array substrate on which data lines, scanning lines, pixel electrodes, etc. are formed in the electro-optical device according to an exemplary embodiment of the present invention.
Figure 3:
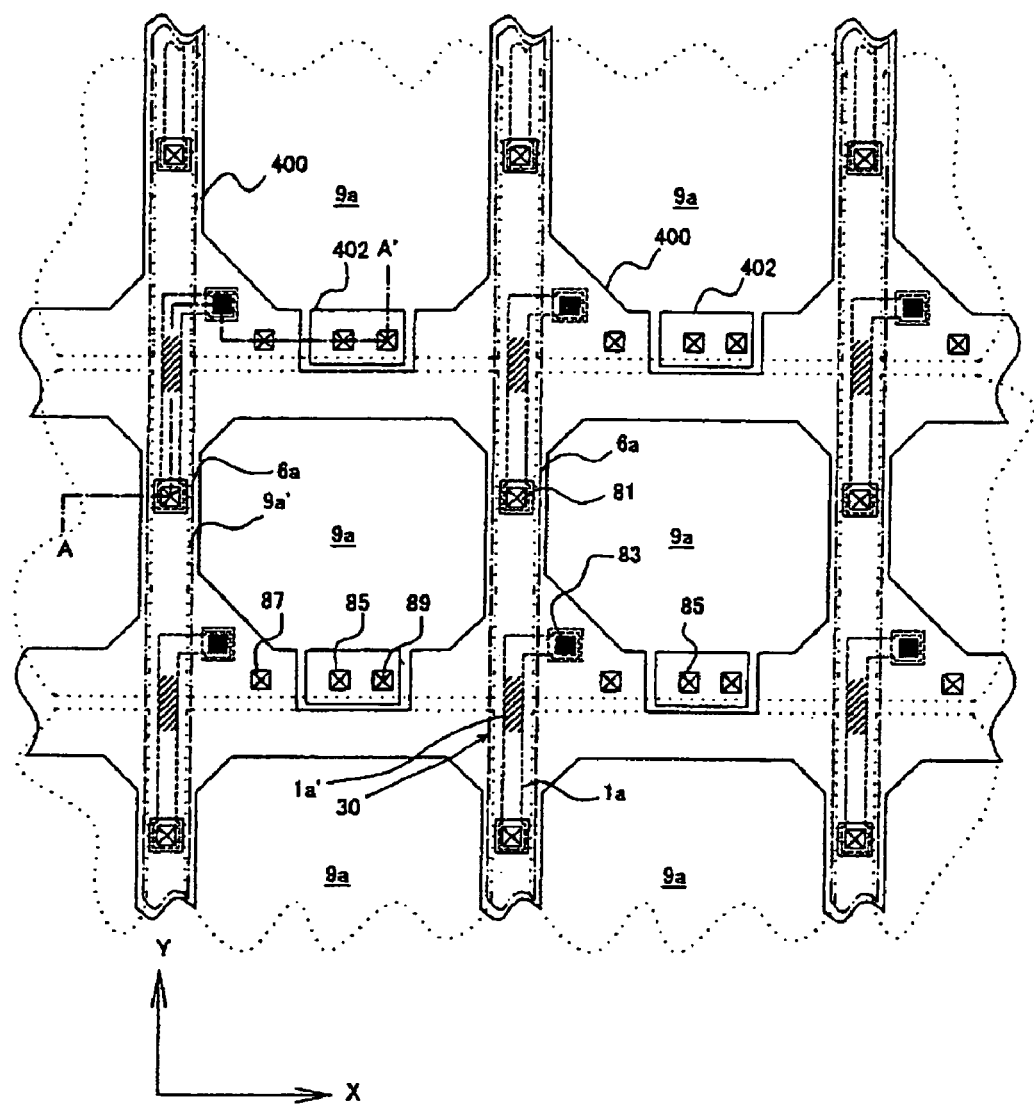
FIG. 3 is a plan view illustrating the only principal parts extracted from FIG. 2 to show an arrangement of data lines, scanning lines and pixel electrodes.
Figure 4:
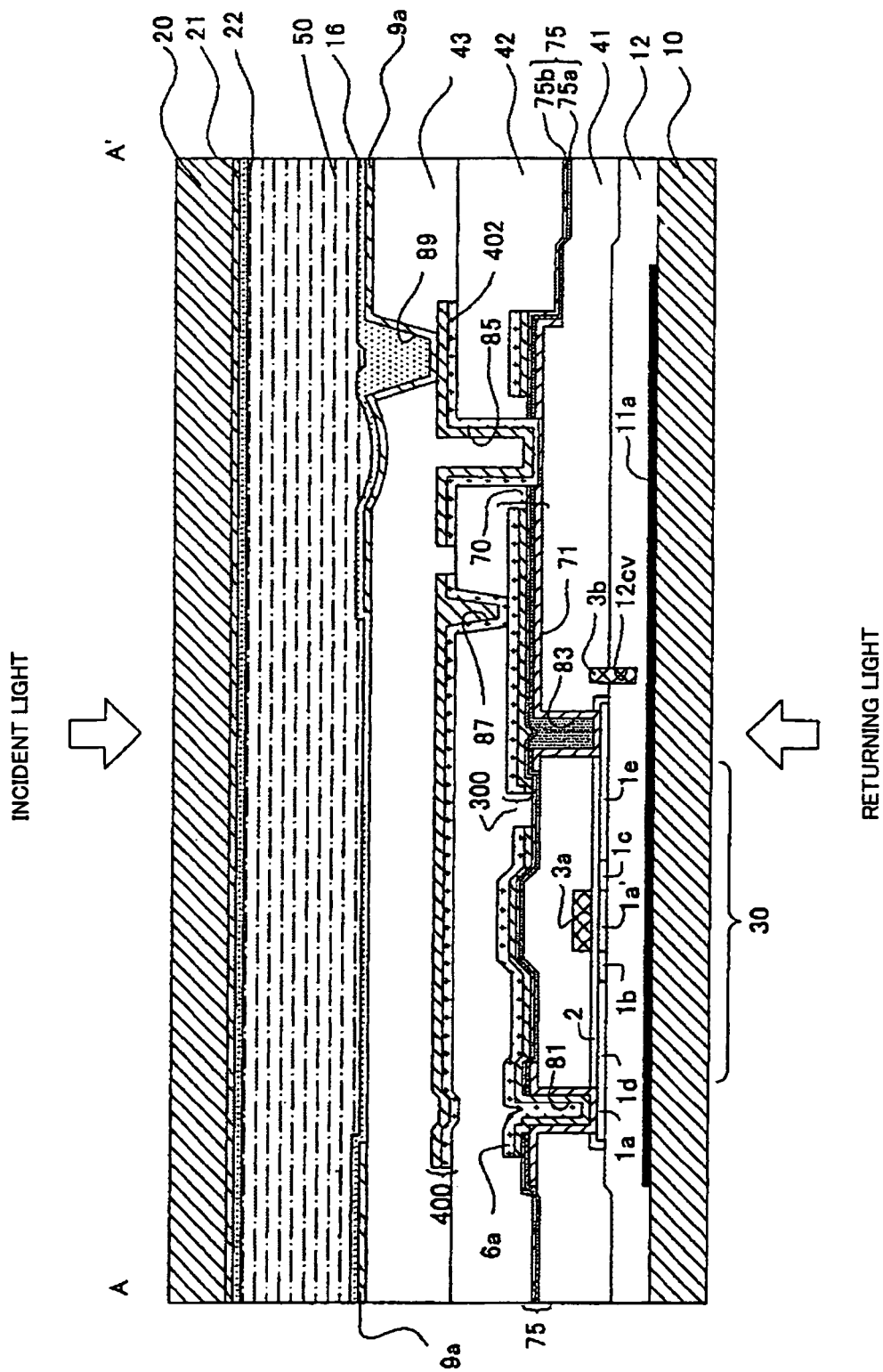
FIG. 4 is a cross sectional view taken along the plane A-A' of FIG. 2.

First, the constitution of the pixel portion of the electro-optical device in the exemplary embodiment of the present invention will be described with reference to FIGS. 1 to 4. Herein, FIG. 1 is a circuit schematic illustrating an equivalent circuit of various elements and wiring lines which are provided in a plurality of pixels having a matrix shape which constitutes image display regions in the electro-optical device. FIG. 2 is a plan view illustrating a plurality of pixel groups which are adjacent to each other on a TFT array substrate on which data lines, scanning lines, pixel electrodes, etc., are formed. In addition, FIG. 3 is a plan view illustrating the only principal parts extracted from FIG. 2, specifically, the arrangement of the data lines, shielding layers, and pixel electrodes. FIG. 4 is a cross sectional view taken along the plane A-A' of FIG. 2. In FIG. 4, each layer and each member are shown in different scales in order to perceive the each layer and each part in sizes recognizable in the drawing.

In FIG. 1, in a plurality of the pixels which are arranged in a matrix and constitute image display regions of the electro-optical device according to the exemplary embodiment, each of pixel electrodes 9a and each of TFTs 30 to control the switching of each of the pixel electrodes 9a are formed and each of data lines 6a to which image signals are applied is electrically connected to sources of the TFTs 30. The image signals S1, S2, . . . , Sn, which are written into the data lines 6a, may be line sequentially applied in this order and, otherwise, may be applied to every group of a plurality of data lines 6a adjacent to each other.

In addition, scanning lines 3a are electrically connected to gates of the TFTs 30 and scanning signals G1, G2, . . . , Gm are line sequentially applied as pulses to the scanning lines 3a in this order at a predetermined timing. The pixel electrodes 9a are electrically connected to the drains of the TFTs 30 and image signals S1, S2, . . . , Sn which are applied from the data lines 6a are written at a predetermined timing by closing the switches of the TFTs 30 which are "switching elements" for a predetermined period.

The predetermined levels of the image signals S1, S2, ..., Sn which are written into the liquid crystal through pixel electrodes 9a, as examples of the electro-optical materials are held for a predetermined period between pixel electrodes and the counter electrodes which are formed on the counter substrate. The liquid crystal modulates light by varying the alignment or order of molecule group in accordance with the applied voltage levels to display the gray scale. If, in a normally white mode, the transmittance ratio to the incident light reduces in accordance with voltages which are applied to each pixel unit, and if, in a normally black mode, the transmittance ratio to the incident light increases in accordance with voltages which are applied to each pixel unit. Totally, light having contrast according to image signals is emitted from the electro-optical device.

Herein, in order to reduce or prevent leakage of the held image signals, storage capacitors 70 are added parallel to the liquid crystal capacitances which are formed between the pixel electrodes 9a and the counter electrodes. The storage capacitors 70 are provided parallel to the scanning lines 3a and each of the storage capacitors include a fixed-potential-side capacitor electrode and a capacitor electrode 300 which is fixed to a constant potential.

Now, the real configuration of the electro-optical device to which the aforementioned circuit operation is realized by the data lines 6a, the scanning lines 3a, and the TFTs 30 will be described with reference to FIGS. 2 to 4.

First, in FIG. 2, a plurality of the pixel electrodes 9a are provided in a matrix on the TFT array substrate 10 (the contours of the pixel electrodes are represented by the dot line portions 9a') and the data lines 6a and the scanning lines 3a are provided along the perpendicular and horizontal boundaries of the pixel electrodes 9a, respectively. The data lines 6a are formed in a laminated structure including aluminum film, etc., as described later, and the scanning lines 3a are made of, for example, conductive polysilicon film. The scanning lines 3a are provided to face the channel regions 1a' which are marked by the forward slanting line regions on the drawing within the semiconductor layers 1a. The scanning lines 3a function as gate electrodes. That is, the pixel switching TFTs 30, in which the main line portions of the scanning lines 3a as the gate electrodes face the channel regions 1a', are formed in the portions where the scanning lines 3a intersect the data lines 6a.

Next, the electro-optical device includes TFT array substrate 10 and counter substrate 20, which is provided to face the TFT array substrate 10 as shown in FIG. 4, which is a cross sectional view along the plane A-A' of FIG. 2. The TFT array substrate 10 is made of, for example, a quartz substrate, a glass substrate, or a silicon substrate, and the counter substrate 20 is made of, for example, a glass substrate or a quartz substrate.

As shown in FIG. 4, the aforementioned pixel electrode 9a is provided at the TFT array substrate 10, and an alignment film 16 on which a predetermined alignment process, such as a rubbing process is carried out is provided above the pixel electrode. The pixel electrode 9a is made of, for example, a transparent conductive film such as an ITO film. On the other hand, the counter electrode 21 is provided over the entire surface of the counter substrate 20, and, an alignment film 22 on which a predetermined alignment process, such as a rubbing process is carried out is provided below the counter electrodes. The counter electrode 21 is made of, for example, a transparent conductive film such as an ITO film similar to the aforementioned pixel electrodes 9a, and the aforementioned alignment films 16 and 22 are made of, for example, a transparent organic film such as a polyimide film. Between the TFT array substrate 10 and the counter substrate 20 which are provided to face like this, liquid crystal layer 50 is formed by sealing electro-optical materials, such as liquid crystal within a space which is surrounded with a sealing material which is described later (see FIGS. 16 and 17). The liquid crystal layer 50 is aligned by the alignment films 16 and 22 in a state where an electric field is not applied from the pixel electrode 9a. The liquid crystal layer 50 is made of electro-optic material, for example, one nematic liquid crystal or a mixture of various kinds of nematic liquid crystal. The sealing material is an adhesive agent formed of, for example, photo-curing resin or thermosetting resin to connect the TFT substrate 10 and the counter substrate 20 at their peripherals. Spacers, such as glass fiber or glass beads for separating both substrates from each other by a predetermined distance, are mixed with the adhesive agent.

On the other hand, on the TFT array substrate 10, besides the aforementioned pixel electrodes 9a and the alignment film 16, various constituents including them are provided in a laminated structure. As shown in FIG. 4, the laminated structure includes, in the following order from TFT array substrate 10, a first layer having lower light-shielding film 11a, a second layer having the TFT 30 and the scanning line 3a, a third layer having the storage capacitor 70 and data line 6a, a fourth layer having shielding layer 400, and a fifth layer (the uppermost layer) having the aforementioned pixel electrode 9a and the alignment film 16. In addition, a base insulating film 12 is provided between the first layer and the second layer, a first interlayer insulating film 41 is provided between the second layer and the third layer, a second interlayer insulating film 42 is provided between the third layer and the fourth layer, and a third interlayer insulating film 43 is provided between the fourth layer and the fifth layer in order to reduce or prevent short circuit among the aforementioned elements. In addition, contact holes to electrically connect heavily doped source regions 1d within the semiconductor layer 1a of the TFTs 30 with the data lines 6a are also provided in the various insulating films 12, 41, 42, and 43. Now, these elements will be described in the aforementioned order from the bottom.

First, the lower light-shielding films 11a which are made of, for example, a metal simple substance, a metal alloy, a metal silicide, a poly silicide, or a structure staking them including at least one of high melting point metals such as Ti (titan), Cr (chromium), W (tungsten), Ta (tantalum), and Mo (molybdenum), etc. is provided on the first layer. The lower light-shielding film 11a is patterned in lattice in plan view, according to such a shape, opening regions for pixels are defined (see FIG. 2). Regions protruding so as to round corners of the pixel electrodes 9a are formed at the regions of the lower light-shielding films 11a where scanning lines 3a and the data lines 6a intersect. In addition, in order to reduce or prevent the potential variation from having a bad effect on the TFTs 30, it is preferable that the lower light-shielding film 11a extend from the image display regions to peripherals thereof to be connected to a constant potential source.

Next, the TFTs 30 and the scanning lines 3a are provided on the second layer. The TFTs 30 have a LDD (lightly doped drain) structures as shown in FIG. 4 and include the scanning lines 3a which function as a gate electrode as described above, the channel regions 1a' of the semiconductor layer 1a where channels are formed by electric fields from the scanning lines 3a made of a polysilicon film, insulating films 2 having gate insulating films which insulate the scanning lines 3a from the semiconductor layer 1a, lightly doped source regions 1b, lightly doped drain regions 1c, heavily doped source regions 1d, and heavily doped drain regions 1e in the semiconductor layer 1a.

Furthermore, although it is preferable that the TFTs 30 has the LDD structure as shown in FIG. 4, the TFTs may have an offset structure where impurity implantation is not performed to the lightly doped source regions 1b and the lightly doped drain regions 1c. Otherwise the TFTs may be a self-aligned type TFT in which impurities are implanted heavily by using the gate electrodes which are formed to be some portions of the scanning lines 3a as masks and then the heavily doped source regions and the heavily doped drain regions are formed in a self-aligned manner. In addition, in the present exemplary embodiment, although the single gate structure in which the only one gate electrode of the pixel switching TFT 30 is provided between the heavily doped source regions 1d and the heavily doped drain regions 1e is used, two or more gate electrodes may be provided between them. Likewise, if the TFT is constructed in dual gates, triple gates, or more, the leakage current at the connection portions of the channel and source regions and the drain regions can be reduced or prevented, so that it is possible to reduce current in the OFF state. In addition, the semiconductor layer 1a which constructs the TFTs 30 may be a non-single crystalline layer or a single crystalline layer. Suitable methods, such as an attaching method, may be used for the formation of the single crystalline layer. In particular, by forming the semiconductor layer 1a with the single crystalline layer, it is possible to obtain high performance of peripheral circuits.

The base insulating film 12 which is made of, for example, a silicon oxide film is provided above the aforementioned lower light-shielding films 11a and below the TFTs 30. Other than the function of insulating the interlayers from the lower light-shielding films 11a to the TFTs 30, the base insulating film 12 has a function of reducing or preventing the properties of the pixel switching TFTs 30 from varying due to the roughness which is generated at the time of polishing the surface of the TFT array substrate 10 or contaminants which remain after the cleaning by forming on the entire surface of the TFT array substrate 10.

Furthermore, in the present exemplary embodiment, particularly, in the base insulating film 12, grooves 12cv extending along the data line 6a to be described later are engraved in both sides of the semiconductor layer 1a in plan view. The scanning lines 3a which are laminated corresponding to the grooves 12cv have concave parts formed at lower sides thereof (these are not shown to avoid complexity in FIG. 2). In addition, by forming the scanning lines 3a so as to bury the entire grooves 12cv, horizontal protrusions 3b, which are formed in one body with the scanning line 3a, are provided to extend to the scanning line 3a. According to such a structure, the semiconductor layer 1a of the TFT 30 is covered from the sides in plan view as well-shown in FIG. 2 so that it is possible to suppress the incident of the light from at least this part. In addition, the horizontal protrusions 3b may be formed at only one side of the semiconductor layer 1a.

Following the aforementioned second layer, on the third layer, a storage capacitor 70 and the data line 6a are provided. The storage capacitor 70 is formed by facing a first relay layer 71 as a pixel-potential-side capacitor electrode, which is electrically connected to the heavily doped drain region 1e of the TFT 30 and the pixel electrode 9a, to capacitor electrode 300 as a fixed-potential-side capacitor electrode through the dielectric film 75. It is possible to greatly enhance the potential holding property of the pixel electrodes 9a by the storage capacitor 70. In addition, the storage capacitors 70 according to the exemplary embodiment are formed not to reach light transmitting region corresponding almost to region to form the pixel electrode 9a as shown in the plan view of FIG. 2, and in other words, the storage capacitor 70 is formed so as to be accommodated into the light-shielding region. Namely, the storage capacitor 70 is formed on a region which overlaps the scanning lines 3a between the adjacent data lines 6a and a region in which the lower light-shielding film 11a rounds the corners of the pixel electrode 9a at corner portions where the scanning line 3a intersects the data line 6a. By doing so, the pixel aperture ratio of the entire electro-optical device is maintained to be relatively large so that it is possible to display brighter images.

More specifically, the first relay layer 71 is made of, for example, a conductive polysilicon film having light-absorbing properties and functions as a pixel-potential-side capacitor electrode. However, the first relay layer 71 may be constructed in a single layer film or a multi-layered film including metals or alloys thereof. In case of the multi-layered film, it is preferable that the lower layers be constructed with the conductive polysilicon film having light-absorbing properties and the upper layers be constructed with metals having light-absorbing properties or alloys thereof. In addition to the function as the pixel-potential-side capacitor electrode, the first relay layer 71 has a function to relay-connect the pixel electrode 9a with the heavily doped drain region 1e of the TFT 30 through contact holes 83, 85, and 89. The first relay layer 71 is formed to have almost the same shape as the plane shape of the capacitor electrode 300 described later as shown in FIG. 2.

The capacitor electrode 300 functions as a fixed-potential-side capacitor electrode of the storage capacitor 70. In the first exemplary embodiment, in order to keep the capacitor electrode 300 to be a fixed potential, the capacitor electrode is electrically connected through the contact hole 87 to the shielding layer 400, which is a fixed potential.

However, as described later, in another exemplary embodiment where the capacitor electrode 300 and the data line 6a are formed on the separate layers, it is preferable that the capacitor electrode 300 be, for example, provided to extend from the image display region 10a on which pixel electrode 9a is provided to the periphery thereof and the capacitor electrode 300 be held to a fixed potential by electrically connecting to the constant potential source. In other words, "the constant potential source" referred to herein may be a constant potential source, such as a positive power source or a negative power source supplied to a data line driving circuit 101 or a constant potential source supplied to the counter electrodes 21 of the counter substrate 20.

Moreover, particularly, in this exemplary embodiment, the data lines 6a are made of the same films as the capacitor electrodes 300. Herein, "the same films" refer to the same layers or layers that are formed at the same time in manufacturing process steps. However, the capacitor electrodes 300 and the data lines 6a are not continuously formed but divided therebetween based on the patterning.

Specifically, as shown in FIG. 2, the capacitor electrodes 300 are formed to overlap the regions forming the scanning lines 3a, that is, to be divided along the X direction in the drawing, and the data lines 6a are formed to overlap the semiconductor layer 1a in the longitudinal direction thereof. For example, to extend in the Y direction in the drawing.

More specifically, the capacitor electrodes 300 includes main line portions which extend along the scanning lines 3a, and protrusions (parts shown as approximate a trapezoid shape in the drawing) protruding upwardly in the drawing along the semiconductor layer 1a in the regions which are adjacent to the semiconductor layer 1a in FIG. 2, and necking parts having "necking shapes" corresponding to the below-described contact holes 85. The protrusions contribute greatly to the increase of the regions forming storage capacitors 70.

On the other hand, the data lines 6a include main line portions which extend linearly along the Y direction in FIG. 2. In addition, the heavily doped drain regions 1e which are at the upper end in FIG. 2 of the semiconductor layer 1a have the shape wherein the regions curve toward the right side perpendicularly, that is, at 90 degrees in order to overlap the regions of the protrusions of the storage capacitors 70, thereby passing over the data line 6a and electrically connecting the semiconductor layer 1a with the storage capacitors 70 (see FIG. 4).

In the exemplary embodiment, such a patterning is performed to obtain the aforementioned shapes, and thus, the capacitor electrodes 300 and the data lines 6a are simultaneously formed.

In addition, the capacitor electrode 300 and the data line 6a are formed of films having a two-layered structure, as shown in FIG. 4, in which the lower layer is made of conductive polysilicon and the upper layer is made of aluminum. Although the data line 6a are electrically connected to the semiconductor layer 1a of the TFT 30 through the contact hole 81 which passes through opening portion of the below-described dielectric film 75, the data line 6a has the aforementioned two-layered structure and the aforementioned first relay layer 71 is constructed with a conductive polysilicon film so that the electrical connection between the data lines 6a and the semiconductor layer 1a can be directly implemented by the conductive polysilicon film. Namely, a polysilicon film of first relay layer, a polysilicon film below the data line 6a, and an aluminum film above the data line are formed in this order from the bottom. Therefore, it is possible to maintain a good electrical connection between them.

Further, since the capacitor electrode 300 and the data line 6a include aluminum having relatively excellent light reflective property and also polysilicon having relatively excellent light absorbing property, the capacitor electrode 300 and the data line 6a can function as light-shielding layers. In other words, the capacitor electrode 300 and the data line 6a are able to block the progress of the incident light (see FIG. 4) for the semiconductor layer 1a at the upper side thereof.

The dielectric film 75 is constructed with a silicon oxide film, such as a HTO (high temperature oxide) film, and a LTO (low temperature oxide) film, etc., or a silicon nitride film and the like having relatively thin thickness, for example, about 5 to 200 nm, as shown FIG. 4. In view of increasing the storage capacitor 70, the thinner dielectric films 75 are preferable as long as sufficient reliabilities of the films are obtained. According to the present exemplary embodiment, particularly, the dielectric film 75 has a two-layered structure with a lower layer formed of a silicon oxide film 75a and an upper layer formed of a silicon film 75b and is formed over the entire surface of the TFT array substrate 10 as illustrated in FIG. 4. Furthermore, according to another example of the dielectric film 75, the lower layer formed of the silicon oxide film 75a is formed over the entire surface of the TFT array substrate 10, and the upper layer formed of the silicon nitride film 75b is patterned to be within the light-shielding region (the non-aperture region). Therefore, it is possible to reduce or prevent the transmittance ratio of the electro-optical device from decreasing due to the presence of the colored silicon nitride film. Accordingly, it is possible to increase the capacitance of the storage capacitor 70 due to the presence of the silicon nitride film 75b with a relatively large dielectric constant. The capacity of the storage capacitor 70 to withstand voltage does not deteriorate due to the presence of the silicon oxide film 75a. As mentioned above, it is possible to obtain two reciprocal effects by the dielectric film 75 having the two-layered structure. Further, it is possible to reduce or prevent moisture from permeating the TFT 30 due to the presence of the silicon nitride film 75b. Therefore, according to the present exemplary embodiment, it is possible to reduce or prevent the threshold voltage of the TFT 30 from increasing and to operate the device for a relatively long time. According to the present exemplary embodiment, the dielectric film 75 has the two-layered structure. However, the dielectric film 75 may have a three or more layer structure such as the silicon oxide film, the silicon nitride film, and the silicon oxide film.

Furthermore, although the data line 6a and the capacitor electrode 300 are constructed in two-layered structures, they may be constructed in three-layered structures with a polysilicon film, an aluminum film, and a titanium nitride film from the lower layer and a titanium nitride film may be used as a barrier metal at the time of opening the contact hole 87.

A first interlayer insulating film 41 is formed above the TFT 30 or the scanning line 3a and below the storage capacitor 70 or the data line 6a. The first interlayer insulating film 41 is made of, for example, a silicate glass film such as NSG (non-doped silicate glass), PSG (phosphorus silicate glass), BSG (boron silicate glass), and BPSG (boron phosphorus silicate glass), a silicon nitride film, a silicon oxide film, or preferably NSG. In addition, the contact hole 81 which electrically connects the heavily doped source region 1d of the TFT 30 with the data line 6a is opened in the first interlayer insulating film 41. Furthermore, the contact hole 83, which electrically connects the heavily doped drain region 1e of the TFT 30 with the first relay layer 71 constituting the storage capacitor 70, is opened in the first interlayer insulating film 41.

In addition, in order not to form the aforementioned dielectric film 75 on the portion for forming the contact hole 81 from the two contact holes, opening portions are formed in the dielectric film 75. The reason for such a formation is that it is necessary to facilitate the electric conduction between the lightly doped source regions 1b and the data lines 6a through the first relay layers 71 on the contact hole 81. Specifically, if such an opening portion is provided in the dielectric film 75, in case of performing a hydrogenation process on the semiconductor layer 1a of the TFT 30, it is possible to obtain the function and effect wherein hydrogen used in the process can easily reach the semiconductor layer 1a through the opening portion.

Furthermore, in the exemplary embodiment, the first interlayer insulating film 41 may undergo a sintering process at 1000° C., and thus, the ions which are implanted into the polysilicon film constituting the semiconductor layer 1a or the scanning line 3a may be activated.

Following the aforementioned third layer, shielding layers 400 are provided on the fourth layer. The shielding layers 400 are formed in lattice to extend in the X and Y directions of FIG. 2 in plan view as shown in FIGS. 2 and 3. The portions of the shielding layers 400 which extend in the Y direction of FIG. 2 are formed to be wider than the data lines 6a, thereby covering the data lines 6a. In addition, the portions which extend in the X direction of FIG. 2 have notched portions in the vicinity of approximately the center position of one side of each pixel electrode 9a in order to ensure regions for forming the below-described second relay layers 402. In addition, at the corner portions of the intersections of the shielding layers 400 which extend in the X and Y directions of FIG. 2, respectively, portions which have approximately a triangle shape are provided to correspond to the protrusions of the capacitor electrodes 300 which have approximately a trapezoid shape. The almost triangular portion is also included in the shielding layer 400. The shielding layer 400 may be as wide as, wider than, or narrower than the lower light-shielding film 11a.

The shielding layers 400 are provided to extend from the image display regions 10a on which the pixel electrodes 9a are provided to their peripherals, and electrically connected to the constant potential source to be at a fixed potential. In addition, "the constant potential source" referred to herein may be the constant potential source, such as a positive power source or a negative power source supplied to a data line driving circuit 101, or a constant potential source supplied to the counter electrodes 21 of the counter substrate 20.

Like this, since the entire data lines 6a are covered (see FIG. 3) and the shielding layers 400 are at the fixed potential, it is possible to remove the influence of the capacitance coupling which occurs between the data lines 6a and the pixel electrodes 9a. Specifically, by the electrical conduction to the data lines 6a, it is possible to reduce or prevent the variation of the potential of the pixel electrodes 9a in advance, and thus, it is possible to reduce the probability of occurrence of the display non-uniformity involved in the data lines 6a on the image. In the exemplary embodiment, since the shielding layers 400 are formed in lattice, it is possible to suppress the unnecessary capacitance couplings at the portions to which the scanning lines 3a extend. In addition, by the aforementioned portions of the triangle shape of the shielding layers 400, it is possible to reduce or prevent the influence of the capacitance coupling which occurs between the capacitor electrode 300 and the pixel electrodes 9a, and by doing so, it is possible to obtain the substantially same functions and effects described above.

In addition, on the fourth layer, second relay layers 402 which are one example of "relay layers" referred to in an aspect of the present invention are formed of the same film as the shielding layers 400. The second relay layers 402 have a function of relaying electrical connection between the pixel electrodes 9a and the first relay layers 71 which constitute the storage capacitors 70 through the below-described contact holes 89. In addition, the shielding layers 400 and the second relay layers 402 are not continuously formed but divided based on the patterning which is similar to the aforementioned capacitor electrodes 300 and the data lines 6a.

On the other hand, the shielding layers 400 and the second relay layers 402 have a two-layered structure in which the lower layer is made of aluminum and the upper layer is made of titanium nitride. Therefore, the titanium nitride is expected to function as the barrier metal to prevent moisture from permeating. Further, in the second relay layer 402, the lower layer formed of aluminum is connected to the first relay layer 71 that forms the storage capacitor 70. The upper layer formed of the titan nitride is connected to the pixel electrode 9a formed of ITO or the like. In this case, particularly, the latter connection is excellent. This is a contrast to the case in that if the aluminum is directly connected to the ITO, a desired electrical connection is not realized because electrolytic corrosion occurs between the aluminum and the ITO, thereby causing the disconnection of the aluminum or insulation due to the formation of alumina. Further, the titan nitride functions as a barrier metal to reduce or prevent penetrating at the time of opening the contact hole 87. As mentioned above, according to the present exemplary embodiment, it is possible to realize excellent electrical connection between the second relay layer 402 and the pixel electrode 9a and thereby to maintain excellent properties of applying voltage to the pixel electrode 9a or maintaining electric potential in the pixel electrode 9a.

In addition, since the shielding layers 400 and the second relay layers 402 include aluminum having relatively good light reflective property and also titanium nitride having relatively good light absorbing property, the shielding layers 400 and the second relay layers 402 can function as light-shielding layers. In other words, the shielding layers 400 and the second relay layers 402 are able to block the travel of the incident light (see FIG. 2) to the semiconductor layer 1a of the TFTs 30 at the upper side thereof. These are similar to the capacitor electrodes 300 and the data lines 6a as described above. In the exemplary embodiment, the shielding layers 400, the second relay layers 402, the capacitor electrodes 300, and the data lines 6a constitute some portions of the laminated structure which is formed on the TFT array substrate 10 and also in consideration of constituting the upper light-shielding film or "some portions of the laminated structure" which block the light incident from the upper side to the TFTs 30, thereby functioning as "an embedded light-shielding film." In addition, according to the concept of the "upper light-shielding film" or the "embedded light-shielding film," the scanning lines 3a, the first relay layers 71 or the like can be also included. Essentially, the "upper light-shielding film" or the "embedded light-shielding film" is to be understood in its wide meaning, and all the structures made of opaque materials constructed on the TFT array substrate 10 can be referred to as the "upper light-shielding film" or the "embedded light-shielding film".

A second interlayer insulating film 42 is formed above the data line 6a and below the shielding layer 400. The second interlayer insulating film 42 is made of, for example, a silicate glass film, such as NSG, PSG, BSG, and BPSG, a silicon nitride film, a silicon oxide film, or preferably NSG. The contact hole 87 which electrically connects the shielding layer 400 with the capacitor electrode 300 and the contact hole 85 which electrically connects the second relay layer 402 with the first relay layer 71, are opened in the second interlayer insulating film 42.

Furthermore, since the second interlayer insulating film 42 does not undergo the sintering process which is described above with respect to the first interlayer insulating film 41, it is preferable to lessen the stress which occurs in the vicinity of the boundary surface of the capacitor electrode 300.

Finally, on the fifth layer, the pixel electrode 9a is formed in a matrix as described above and the alignment film 16 is formed on the pixel electrode 9a. The pixel electrode 9a may have the shape that their corner portions are cut. In addition, a third interlayer insulating film 43 is formed below the pixel electrode 9a. The third interlayer insulating film 43 is made of, for example, a silicate glass film, such as NSG, PSG, BSG, and BPSG, a silicon nitride film, a silicon oxide film, or preferably BPSG. The contact hole 89 which electrically connects the pixel electrode 9a with the second relay layer 402 is opened on the third interlayer insulating film 43. In addition, particularly, in the exemplary embodiment, the surface of the third interlayer insulating film 43 is planarized by CMP (chemical mechanical polishing) process, etc., so that it is possible to reduce the disorder of the alignment state of the liquid crystal layer 50 due to the step difference in the various wiring lines or elements which exist at the lower portions of the third interlayer insulating film 43. However, other than or addition to, the aforementioned planarization process on the third interlayer insulating film 43, grooves may be engraved on at least one of the group including the TFT array substrate 10, the base insulating film 12, the first interlayer insulating film 41, and the second interlayer insulating film 42 and the wiring lines, such as data lines 6a or the TFTs 30 are buried therein, thereby performing the planarization process.

In the electro-optical device according to the first exemplary embodiment having the above structure, generally, it is possible to obtain the following three effects. First, it is possible to reduce or exclude the influence of the capacitance coupling between the pixel electrode 9a and the data line 6a because the shielding layer 400 is formed in the laminated structure on the TFT array substrate 10. That is, the shielding layer 400 has a fixed potential by being connected to an electrostatic potential source disposed out of the image display region 10a and is formed to cover the data line 6a, it is possible to reduce or prevent the potential of the pixel electrode 9a from changing due to the conduction of the data line 6a in advance. Therefore, according to the first exemplary embodiment, the irregularity in display of an image along the data line 6a is hardly generated.

Second, it is possible to enhance the moisture-proof property of the TFT 30 because the shielding layer 400 includes titanium nitride. This is because a nitride including the titanium nitride has a dense structure and reduces or prevents the permeation and diffusion of moisture. Therefore, according to the first exemplary embodiment, it is possible to prolong the life of the TFT 30 and comparatively long-term operation of the electro-optical device becomes possible.

Third, it is possible to reduce or prevent the occurrence of electrolytic erosion caused by the ITO which constitutes the pixel electrode 9a because the second relay layer 402 to electrically connect the pixel electrode 9a to the TFT 30 is formed according to the first exemplary embodiment. In particular, the second relay layer 402 includes the titanium nitride where the electrolytic erosion caused by the ITO hardly occurs because the second relay layer 402 is formed of the same film as the shielding layer 400. Therefore, according to the first exemplary embodiment, it is reduce or possible to prevent the cutting of electric connection between the pixel electrode 9a and the TFT 30 in advance and thereby to smoothly drive the pixel electrode 9a.

According to the first exemplary embodiment, the following concomitant effects are obtained concerning the shielding layer 400 and the second relay layer 402.

That is, according to the first exemplary embodiment, the data line 6a is formed of the same film as the capacitor electrode 300 which constitutes the storage capacitor 70. Therefore, according to the first exemplary embodiment, it is not necessary to form a new separate layer for the shielding layer 400 because a structure of arranging the shielding layer 400 having the above effects between the pixel electrode 9a and the data line 6a is adopted. That is, it is possible to reduce or prevent increase in the number of layers in the laminated structure. As a result, it is possible to easily manufacture the electro-optical devices and to enhance the yield of the manufactured products.

It is also possible to naturally arrange the second relay layer 402. That is, when the data line 6a is formed of the same film as the capacitor electrode 300, it is possible to naturally provide the second relay layer 402 between the capacitor electrode 300 and the pixel electrode 9a.

Furthermore, it is possible to establish good electric connection between the data line 6a and the TFT 30, as described before, because the data line 6a has a two-layered structure of an aluminum film and a conductive polysilicon film.

As mentioned above, according to the first exemplary embodiment, it is possible to exclude the influence of the capacitance coupling between the pixel electrode 9a and the data line 6a, to prolong the life of the TFT 30, and to establish good electric connection between the pixel electrode 9a and the second relay layer 402, between the pixel electrode 9a and the TFT 30, and between the data line 6a and the TFT 30. Therefore, it is possible to display an image with higher quality compared with the related art.

Second Exemplary Embodiment

Figure 6:
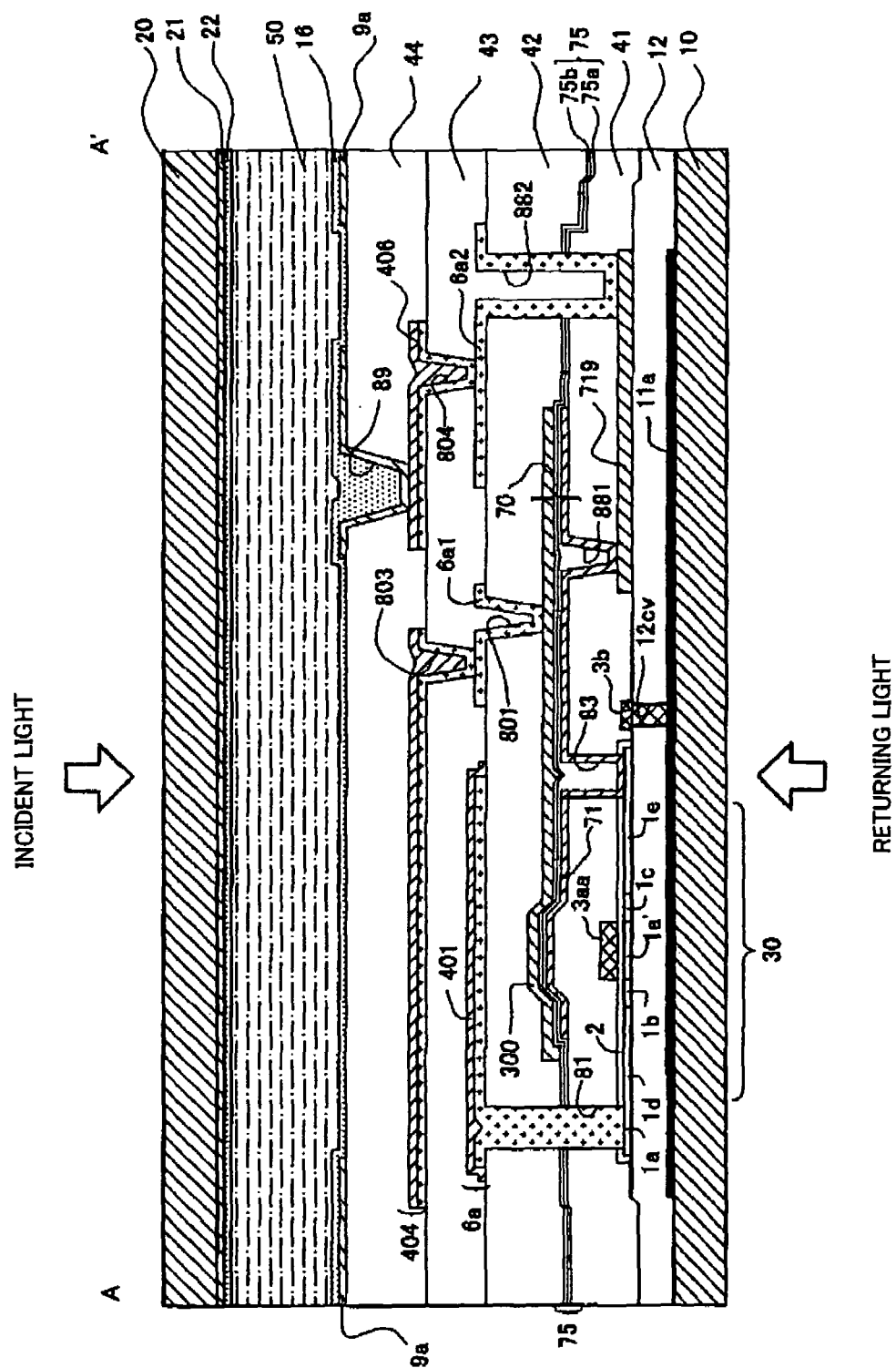
FIG. 6 is a cross sectional view taken along the plane A-A' of FIG. 5.
Figure 7:
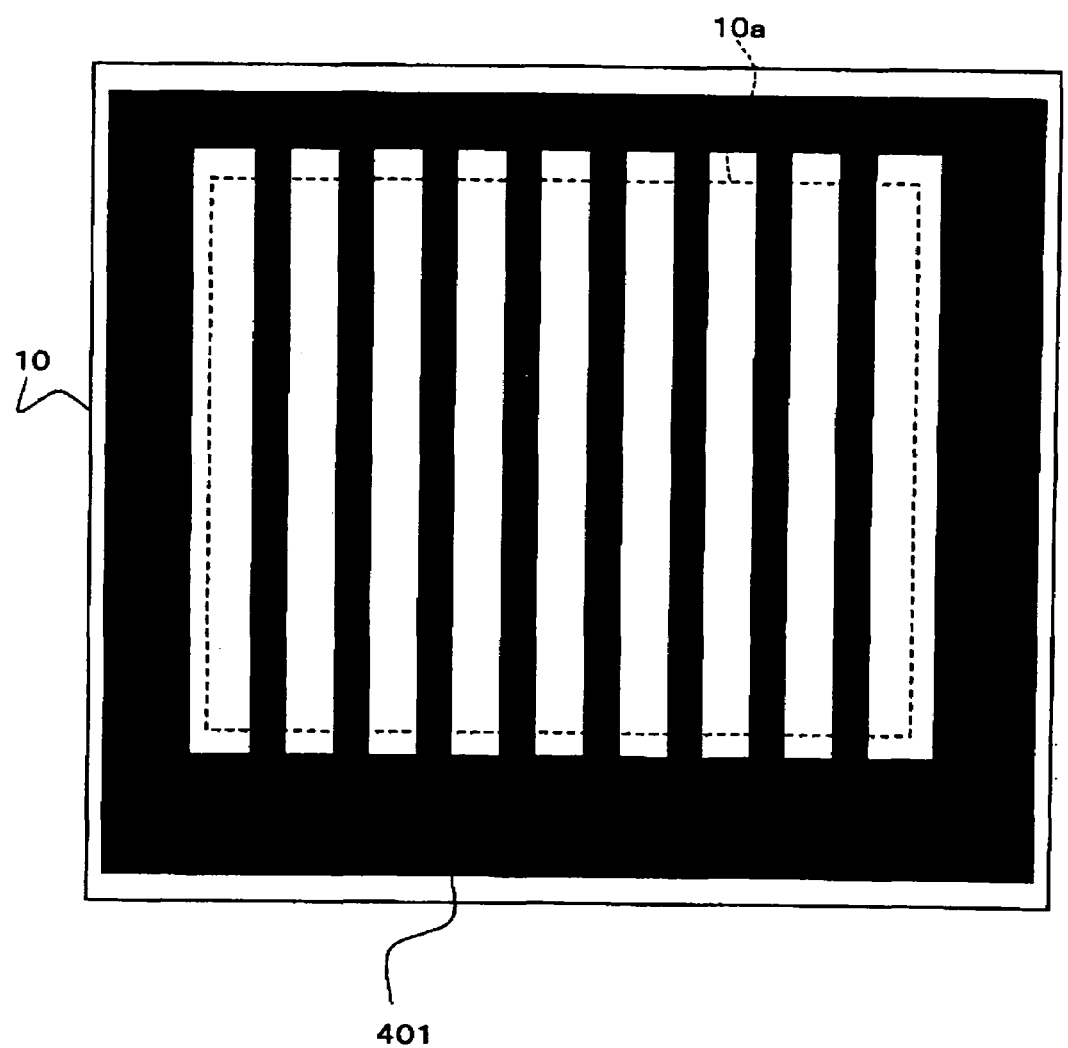
FIG. 7 is a plan view illustrating an aspect where the nitride film according to the second exemplary embodiment is formed (on the data lines and out of the image display region)
Figure 8:
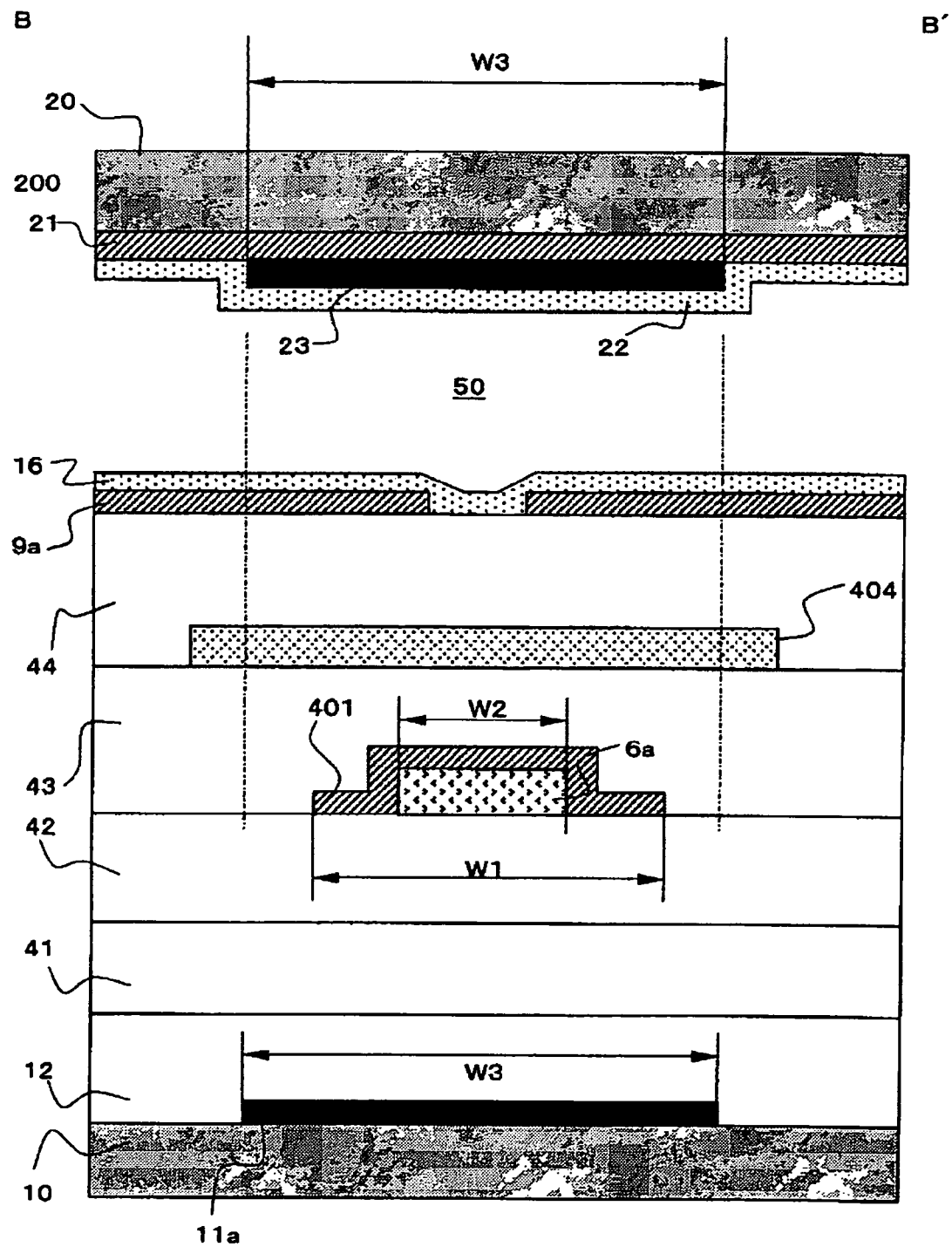
FIG. 8 is a cross sectional view taken along the plane B-B' of FIG. 5.
Figure 9:
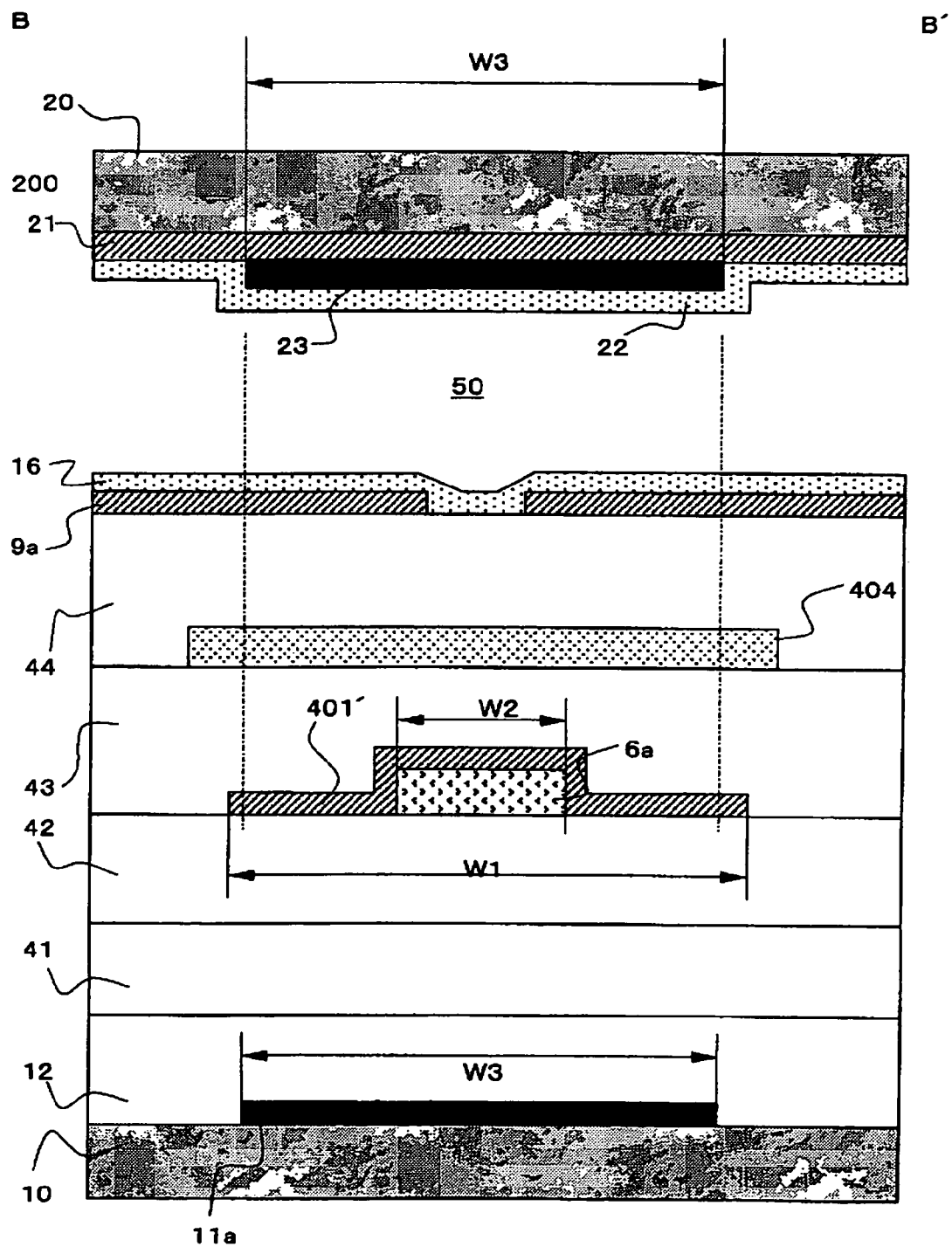
FIG. 9 illustrates a modification of FIG. 8.

Next, an electro-optical device according to the second exemplary embodiment of the present invention will now be described with reference to FIGS. 5 to 8. FIG. 5 is for the same purpose as FIG. 2 and illustrates another aspect where the structures of the shielding layers and the data lines are different from those of FIG. 2. FIG. 6 is for the same purpose as FIG. 4, is a cross sectional view taken along the plane A-A' of FIG. 5, and illustrates another aspect where the structures of the data lines and the shielding layers are different from those of FIG. 4. FIG. 7 is a plan view illustrating an aspect of a nitride film formed on the data lines. FIG. 8 is a cross sectional view taken along the plane B-B' of FIG. 5. FIG. 9 illustrates a modification of FIG. 8. In addition, structure of the pixel part of the electro-optical device in the second exemplary embodiment is generally equivalent to that of the electro-optical device in the first exemplary embodiment. Therefore, hereinafter, only specific points of the second exemplary embodiment will be explained, but the other points thereof will be omitted or simplified.

In the second exemplary embodiment, as shown in FIG. 6, as compared with FIG. 4, the capacitor electrode 300, which is the upper electrode constituting the storage capacitor 70, and the data line 6a, are not made of the same film, and in addition, interlayer insulating film is added thereto. Specifically, the difference is that one more new "fourth interlayer insulating film 44" is provided and a relay electrode 719 is formed of the same film as the gate electrode 3aa. By doing so, in the following order starting from the TFT array substrate 10, a first layer which includes the lower light-shielding film 11a functioning also as scanning line, a second layer which includes the TFT 30 having the gate electrode 3aa, a third layer which includes the storage capacitor 70, a fourth layer which includes the data line 6a, a fifth layer on which the shielding layer 404 is formed, a sixth layer (the uppermost layer) which includes the aforementioned pixel electrode 9a and the alignment film 16, and the like are provided. Furthermore, the base insulating film 12 is formed between the first layer and the second layer, the first interlayer insulating film 41 is formed between the second layer and the third layer, the second interlayer insulating film 42 is formed between the third layer and the fourth layer, the third interlayer insulating film 43 is formed between the fourth layer and the fifth layer, and the fourth interlayer insulating film 44 is formed between the fifth layer and the sixth layer, thereby reducing or preventing a short circuit between the aforementioned constituents. According to the present example, instead of the scanning line 3*a* formed in the second layer according to the first exemplary embodiment, the gage electrode 3*aa* is formed instead of the scanning line 3*a* according to the second exemplary embodiment. The relay layer 719 is newly formed of the same film as the gate electrode 3*aa*. The structure of each layer will now be described in more detail.

First, in a second layer, gate electrodes 3*aa* are formed so as to oppose to channel regions 1*a'* of semiconductor layers 1*a*. Such gate electrodes 3*aa* are not formed in the shape of lines as the scanning lines in the first exemplary embodiment, but formed in the shape of islands in conformity with the shape that semiconductor layers 1*a* and channel regions 1*a'* are formed in the shape of islands on a TFT array substrate 10. Further, in the second exemplary embodiment, bottoms of grooves 12*cv* of contact holes contact to surfaces of the lower light-shielding films 11*a* of the first layer, respectively, and the lower light-shielding films 11*a* are formed in the shape of stripe extending in the direction of X in FIG. 5. As a result, gate electrodes 3*aa* formed on the grooves 12*cv* is electrically connected through the grooves 12*cv* to the lower light-shielding films 11*a*. That is, in the second exemplary embodiment, scanning signals are supplied through the lower light-shielding films 11*a* to the gate electrodes 3*aa*. In other words, the lower light-shielding film 11*a* in the second exemplary embodiment functions as scanning lines.

Further, the lower light-shielding films 11*a* in the second exemplary embodiment have protrusions along extending direction of data lines 6*a*, as shown in FIG. 5. By such protrusions, the lower light-shielding film 11*a* in the second exemplary embodiment also accomplishes a light-shielding function equivalent to that of the lower light-shielding film 11*a* in lattice shape the first exemplary embodiment. But, protrusions, which extend from the lower light-shielding films 11*a* adjacent to each other, are not contacted to each other and are electrically isolated. Otherwise, the lower light-shielding films 11*a* cannot function as scanning lines. Further, the lower light-shielding films 11*a* have protrusions at intersection regions with the data lines 6*a*, thereby enabling rounding corners of the pixel electrodes 9*a*. The lower light-shielding film 11*a* is formed to shield the TFT 30, the scanning line 3*a*, the data line 6*a*, the storage capacitor 70, the shielding relay layer 6*a*1, the second relay layer 6*a*2, and the third relay layer 406 in the order from the lower side.

And, particularly in the second exemplary embodiment, the above-described gate electrodes 3*aa* and relay electrodes 719 are formed in the same films. The relay electrodes 719 are formed at about center part of a side of each pixel electrode 9*a* in the shape of islands in plan view, as shown in FIG. 5. Because the gate electrodes 3*aa* and the relay electrodes 719 are formed in the same films, when the latter are made of, for example, conductive polysilicon film or the like, the former is also made of conductive polysilicon or the like.

Next, a first relay layers 71 constituting storage capacitors 70, dielectric films 75, and capacitive electrodes 300 are formed in third layers. The first relay layers 71 in the third layers are formed of polysilicon. And, because the capacitive electrodes 300 are not formed together with the data lines 6*a*, like the first exemplary embodiment, considering electrical connection between the data lines and the TFTs 30, it is not necessary to take a double-layer structure of an aluminum film and a conductive polysilicon film. Thus, the capacitive electrodes 300 are made of light-shielding materials, such as metal simple substance, alloy, metal silicide, poly silicide, and stacks thereof including, for example, at least one of high-melting-point metals such as Ti (titan), Cr (chromium), W (tungsten), Ta (tantalum), Mo (molybdenum) and so on, as similar to the lower light-shielding films 11*a*. By doing so, the capacitive electrodes 300 can function as the "upper light-shielding film" and "embedded light-shielding film" described above very well.

Further, for the same reason, in other words, since the capacitor electrode 300 and the data line 6*a* are formed in different layers, it is not necessary to establish electric insulation between the capacitor electrode 300 and the data line 6*a* in the same plane. Therefore, it is possible to form the capacitor electrode 300 as a part of a capacitive line that extends in the direction of the scanning line 3*a*.

As illustrated in FIG. 5, the storage capacitor 70 is formed in a cross shape in the extending directions of the scanning line 3*a* and the data line 6*a* because the storage capacitor 70 is formed between the TFT 30 and the data line 6*a*. Therefore, it is possible to increase storage capacitance and to enhance a property of shielding the TFT 30 from light due to the light-shielding capacitor electrode 300. Further, it is possible to increase the storage capacitance and to enhance the light-shielding property by forming the storage capacitor 70 in the corners of the pixel electrode 6*a* where the lower light-shielding film 11 or the shielding layer 400 is formed.

As described above, although first interlayer insulating films 41 are formed on the gate electrodes 3*aa* and the relay electrodes 719 and under the storage capacitors 70, it is preferable that the first interlayer insulating films 41 are formed of silicate glass films, such as NSG, PSG, BSG, and BPSG, nitride oxide films, silicon oxide films, or the like. Further, contact holes 881, which are arranged so as to electrical connect with center parts of bottom surfaces of the relay electrodes 71 in FIG. 6, are opened. As a result, the first relay layers 71 can be electrically connected to the relay electrodes 719. Further, in order to electrically connect with second relay layers 6*a*2, contact holes 882 are opened through second interlayer insulating films 42 described below as well as the first interlayer insulating film 41.

On the other hand, although data lines 6*a* are formed in a fourth layer, likewise the capacitive electrodes 300 described above, the data lines 6*a* do not have to take double-layer structure. For example, it is preferable that the data lines 6*a* are made of conductive materials, such as aluminum simple substance, aluminum alloy, other metals or alloy. But, because the reason why such data lines 6*a* have to be electrically connected to the semiconductor layers 1*a* of the TFTs 30 is equivalent to the first exemplary embodiment, it is preferable that conductive polysilicon films are provided to portions directly contacted with the semiconductor layers 1*a*. In FIG. 6, a film formed of the same film as the first relay layer 71 is formed in the contact hole 81, thereby satisfying the above requirements.

And, in the second exemplary embodiment, nitride films 401 are formed along the direction of, and on the data lines 6*b* made of aluminum, as described above, and are made of, for example, SiN films, SiON films or TiN films. However, the nitride films 401 according to the present exemplary embodiment are formed in a rectangular shape also around image display regions 10*a*, in addition to on the data lines 6*a*, defined as regions formed with pixel electrodes 9*a* arranged in a matrix, data lines 6*a* arranged so as to thread through such electrodes, and scanning lines 3*a*. In addition, the thickness of such nitride films 401 is set to, for example, about 10 to 100 nm, and more preferably, about 10 to 30 mm.

As described above, the nitride films 401 according to the present exemplary embodiment are formed on the TFT array substrate 10 in the same shape as entire-schematically shown in FIG. 7. Further, in FIG. 7, the nitride film 401 provided around the image display regions 10a, and more particularly, SiN films or SiON films capable of constituting such nitride films 401 greatly contribute to reduce or prevent water from invading CMOS (Complementary MOS) type TFT constituting data line driving circuits 101 and scanning line driving circuits 104 described below (see FIG. 16). However, compared with general materials, because low etching rate in dry-etching or the like may be estimated, when nitride films 401 are formed in environs of the image display regions 10a described above and if it is needed to form contact holes in the environs, it is preferable to previously open holes in the nitride films 401 at positions corresponding to the contact holes. If such processing is performed together with patterning illustrated in FIG. 7, it is helpful to simplify the manufacturing process.

In addition, in new fourth layers, first relay layers 6a1 and second relay layers 6a2 (but, slightly different from "the second relay layers" in the first exemplary embodiment in a sense) for a shielding layer are formed in the same films as the data lines 6a. The former are relay layers to electrically connect shielding layers 404 having light-shielding properties with the capacitive electrodes 300, and the latter are relay layers to electrically connect pixel electrodes 9a with the first relay layers 71. Further, such relay layers are made of the same material as the data lines 6a.

As described above, although a second interlayer insulating films 42 are formed on the storage capacitors 70 and under the data lines 6a and the relay layers 6a1, 6a2 for shielding layers, it is preferable that the second interlayer insulating films 42 are formed of silicate glass films, such as NSG, PSG, BSG, and BPSG, nitride oxide films, silicon oxide films, or the like, as similarly described above.

Further, contact holes 801 and the contact holes 882 are opened in the second interlayer insulating films 42 to correspond to the relay layers 6a1, 6a2 for shielding layers.

Next, in new fifth layers, shielding layers 404 having light-shielding properties. It is preferable that such layers are formed in, for example, double-layer structure including an upper layer of nitride titanium and a lower layer of aluminum, or, if necessary, is formed of conductive material such as ITO, similar to the shielding layers 400 described above. Such shielding layers 404 are electrically connected through the relay layers 61a for shielding layers described above to capacitive electrodes 300. By doing so, the shielding layers 404 are held to constant potential, and similarly to the first exemplary embodiment, the interference of capacitor coupling generated between pixel electrodes 9a and the data lines 6a can be excluded. The light-shielding layer 400 may be as wide as, wider than, or narrower than the lower light-shielding layer 11a. However, the light-shielding layer 400 is formed to shield the TFT 30, the scanning line 3a, the data line 6a, and the storage capacitor 70, excluding the third relay layer 406, in the order from the upper side. The shielding layer 400 and the lower light-shielding layer 11 define the corners, that is, the four corners of the pixel aperture region and the respective sides of the pixel aperture region.

Further, the third relay layer 406 is formed of the same film as the shielding layer 404 in the fifth layer.

As described above, third interlayer insulating films 43 are formed on the data lines 6a and below the shielding layers 404. Such third interlayer insulating films 43 can be formed of the same material as the second interlayer insulating film 42. But, when the data lines 6a contain aluminum or the like described above, in order to avoid exposure to high-temperature atmosphere, it is desirable that the third interlayer insulating films 43 are formed by using low-temperature film growing method such as plasma CVD or the like.

In addition, contact holes 803 are opened in the third interlayer insulating films 43 to electrically connect the shielding layers 404 with the relay layers 6a1 for shielding layers described above, and contact holes 804, which are connected with the second relay layers 6a2 and correspond to third relay layers 406, are opened.

With regard to the other configuration, in new sixth layers, pixel electrodes 9a and alignment films 16 are formed, and fourth interlayer insulating films 44 are formed between the new sixth and fifth layers. And, in the fourth interlayer insulating films 44, contact holes 89 are opened to electrically connect the pixel electrodes 9a with the third relay layers 406.

Further, in above-described structures, because the third relay layers 406 are directly contacted to the pixel electrodes 9a made of ITO or the like, electrical erosion described above should be noticed. Thus, considering such points, it is preferable that the shielding layers 404 and the third relay layers 406 are formed in the double-layered structure including aluminum and nitride titanium, similarly to the first exemplary embodiment. Further, it is needless to worry about electrical erosions between the third relay layers 406 and the pixel electrodes 9a when the shielding layers 404 and the third relay layers 406 are formed of ITO, but it is necessary to worry about electrical erosions between the shielding layers 404 and the relay layers 6a1 for shielding layers or between the third relay layers 406 and the second relay layers 6a2. Thus, in order to avoid direct contact of the ITO and aluminum, it is desirable that the relay layers 6a1 for shielding layers, the second relay layers 6a2, and the data lines 6a should adopt a proper double-layer structure.

Alternatively, in the second exemplary embodiment, because the capacitive electrodes 300 can be formed as portions of the capacitive lines, in order to hold the capacitive electrodes 300 constant potential, it is preferable that the capacitive lines be extended to outer regions of the image display regions 10a so as to be connected to constant potential source. Further, because the capacitive lines including the capacitive electrodes 300 can be connected the constant potential source individually by themselves and the shielding layers 404 can be connected the constant potential source individually by them selves, when such configurations are adopted, it is needless to form the contact holes 801, 803 to electrically connect both with each other. Thus, in such case, when materials for the shielding layers 404 and the capacitive electrodes 300 or relay layers 6a1 for shielding layers are selected (originally, the relay layers 6a1 for corresponding shielding layer are not needed yet), it is needless to consider generation of "electrical erosion".

In an electro-optical device according to the second exemplary embodiment having such structure, first, it is apparent that the substantially same effect as the first exemplary embodiment can be obtained. Thus, similarly to the first exemplary embodiment, it is possible to reduce or exclude the influence of the capacitance coupling generated between the data line 6a and the pixel electrode 9a by the presence of the shielding layer 404 and to avoid the risk of generation of electrical erosion caused by ITO constituting the pixel electrodes 9a by the presence of the third relay layers 406.

And, in the second exemplary embodiment, particularly, because the nitride films 401 are formed on the data lines 6a and peripheral regions of the image display regions 10a, it is possible to furthermore enhance of resistant property to moisture of the TFT 30. Namely, because nitride film and nitride greatly effectively prevent invasion and diffusion of moisture as already described, it is possible to shield the semiconductor layers 1a of the TFT 30 from moisture invasion in advance. Besides, in the second exemplary embodiment, nitride films may be used for the shielding layers 404, the third relay layers 406, and dielectric films 75 constituting the storage capacitors 70, but when such nitride films are provided to all structures, moisture invasion can be more effectively reduced or prevented. However, it is needless to say that a configuration in that "nitride films" are not formed at all structures is acceptable.

Further, in the second exemplary embodiment, because the nitride films 401 are provided, in the fourth layer, on only the data lines 6a except outer regions of the image display regions 10a, without great inner-stress concentration, it does not occur that the nitride films 401 are destroyed due to the inner-stress thereof, or cracks are produced, for example, at the third interlayer insulating films 43 provided around the nitride films 401 due to outer action of the inner-stress. On the assumption that nitride films are provided at entire surfaces of the TFT array substrate 10, it is more apparent.

In addition, nitride films 401 in the second exemplary embodiment have relatively small thickness of about 10 to 100 nm, and more preferably, about 10 to 30 nm so that action effect described above can be more effectively obtained.

Further, in the second exemplary embodiment, particularly, following action effect can be obtained because relay layers 719 are provided. That is, in FIG. 4, in order to electrically connect the TFTs 30 with the pixel electrodes 9a, like contact hole 85 shown in FIG. 4, it is necessary to contact to "top surface" in the drawing of the first relay layer 71 which is the lower electrode of the storage capacitor 70.

But, in such structure, in the step of forming the capacitive electrodes 300 and the dielectric films 75, when etching precursor films thereof, it can be a troublesome manufacturing process that corresponding precursor films are etched with remaining the first relay layers 71 positioned right below the films as reliable states. Particularly, like the present invention, in a case that material having a high dielectric constant is used as the dielectric films 75, because it is generally difficult to etch and situations that etching rates in the capacitive electrodes 300 and the high dielectric-constant material are different from each other are amassed, it is more difficult to perform the corresponding manufacturing process. Thus, in such cases, there is a high possibility that so called "penetrations" appear in the first relay layers 71. As a result, in a bad case, there may be a short between the capacitive electrodes 300 and the first relay layers 71 which constitute the storage capacitors 70.

Nevertheless, like the present exemplary embodiment, when the TFTs 30 are electrically connected to the pixel electrodes 9a by providing the relay layers 719 so that the first relay layers 71 have electrical contact points at bottom surfaces thereof in the drawing, the above-described problems do not happen. The reason is, as apparent from FIG. 6, that it is not necessary to perform the step for remaining the first relay layers 71 as reliable states when the capacitive electrodes 300 and the precursor films of the dielectric films 75 are etched.

In addition, the dielectric film 75 has a two-layered structure, as shown in FIG. 6, in which the lower layer is a silicon oxide film 75a and the upper layer is a silicon nitride film 75b and is formed over the entire surface of the TFT array substrate 10. Furthermore, in the other example of the dielectric film 75, the lower layer of the silicon oxide film 75a may be formed over the entire surface of the TFT array substrate 10 and the upper layer of the silicon nitride film 75b may be patterned to be accommodated in a light-shielding region (a non-opening region), so that the silicon nitride film having colorability can reduce or prevent the decrease of the transmittance.

As described above, according to the present exemplary embodiment, because it is needless to perform the troublesome etching process described above, it is possible to excellently realize the electrical connections between the first relay layers 71 and the pixel electrodes 9a. This is because electrical connections are realized through the relay layers 719. That is, according to the present exemplary embodiment, there is little possibility of shorts between the capacitive electrodes 300 and the first relay layers 71. Namely, it is possible to quite suitably form defective-free storage capacitors 70.

According to the second exemplary embodiment, it is possible to obtain various modifications described hereinafter in order to obtain the effect of reducing or preventing the permeation of moisture and other useful effects.

First, it will be described how to appropriately establish the relationship among the width of the data line 6a, the width of the nitride film 401 on the data line 6a, and the width of the lower light-shielding film 11a. When the width of the nitride film 401, the width of the data line 6a, and the width of the lower light-shielding film 11a are respectively denoted by W1, W2, and W3, it is preferable that the relationship of $W2<W1 \leq W3$ be satisfied. In this case, the structure described in FIG. 8 that is a cross sectional view taken along the plane B-B' of FIG. 5 is obtained. In FIG. 8, as described above, the width W1 of the nitride film 401 is larger than the width W2 of the data line 6a and equal to or smaller than the width W3 of the lower light-shielding film 11a. This means that the edges of the nitride film 401 do not reach a light transmission region. In FIG. 8, one-dot chain lines to partition the light transmission regions from regions which do not transmit light are drawn on the right and left sides of the region corresponding to the width W3 of the lower light-shielding film 11a. However, the nitride film 401 does not exist on the right (or left) side over the right (or left) one-dot chain line. In short, the edges of the nitride film 401 do not reach the light transmission regions. Therefore, according to the above configuration, it is possible to reduce or prevent the transmittance ratio of the electro-optical device from being reduced and thereby to display an image with brighter, high quality. According to the above case, the edges of the nitride film 401 are preferably wider than the edges of the data line 6a by 0.1 to 0.5 μm (That is, (W1−W2)/2=0.1 to 0.5 μm).

Further, the structure of the counter substrate 20 in FIG. 8 (and FIG. 9 that is referred to later) is described. A light-shielding film 23, as well as the counter electrode 21 and the alignment film 22, are formed on the counter substrate 20. The light-shielding film 23 on the counter substrate side, similar to the lower light-shielding film 11a, is formed of a single substance of metal, an alloy, metal silicide, poly silicide, a stacked material of the above, which includes at least one of the group including Ti, Cr, W, Ta, and Mo, which are high melting point metals, or resin black, and is patterned in the form of a lattice. According to the present exemplary embodiment, as illustrated in FIGS. 8 and 9, the light-shielding film 23 has the width W3 equal to the width W3 of the lower light-shielding film 11a.

It is possible to surely reduce or prevent the mixture of light among pixels and to shield the TFT 30 from light due to the light-shielding film 23 on the counter substrate side. The width of the lower light-shielding film 11a is equal to the width of the light-shielding film 23 according to the above description. However, the former may be smaller than the latter. By doing so, it is possible to reduce or prevent light incident on the electro-optical device at an angle from being reflected and thereby to enhance the performance of shielding the TFT 30 from light.

Next, it is preferable that the relationship of W2<W1 and W3<W1 be satisfied instead of the relationship of W2<W1≦W3. In the above case, the structure illustrated in FIG. 9 for the same purpose as FIG. 8 is obtained. In FIG. 9, as previously described, the width W1 of the nitride film 401' is larger than the width W2 of the data line 6a and the width W3 of the lower light-shielding film 11a. Therefore, according to the above configuration, the nitride film 401' reaches the light transmission regions. However, when the resultant obtained by subtracting W2 from W3 is not so large, the structure does not actually affect the light transmittance ratio of the electro-optical device and thus, does not necessarily deteriorate the brightness of an image.

Figure 10:
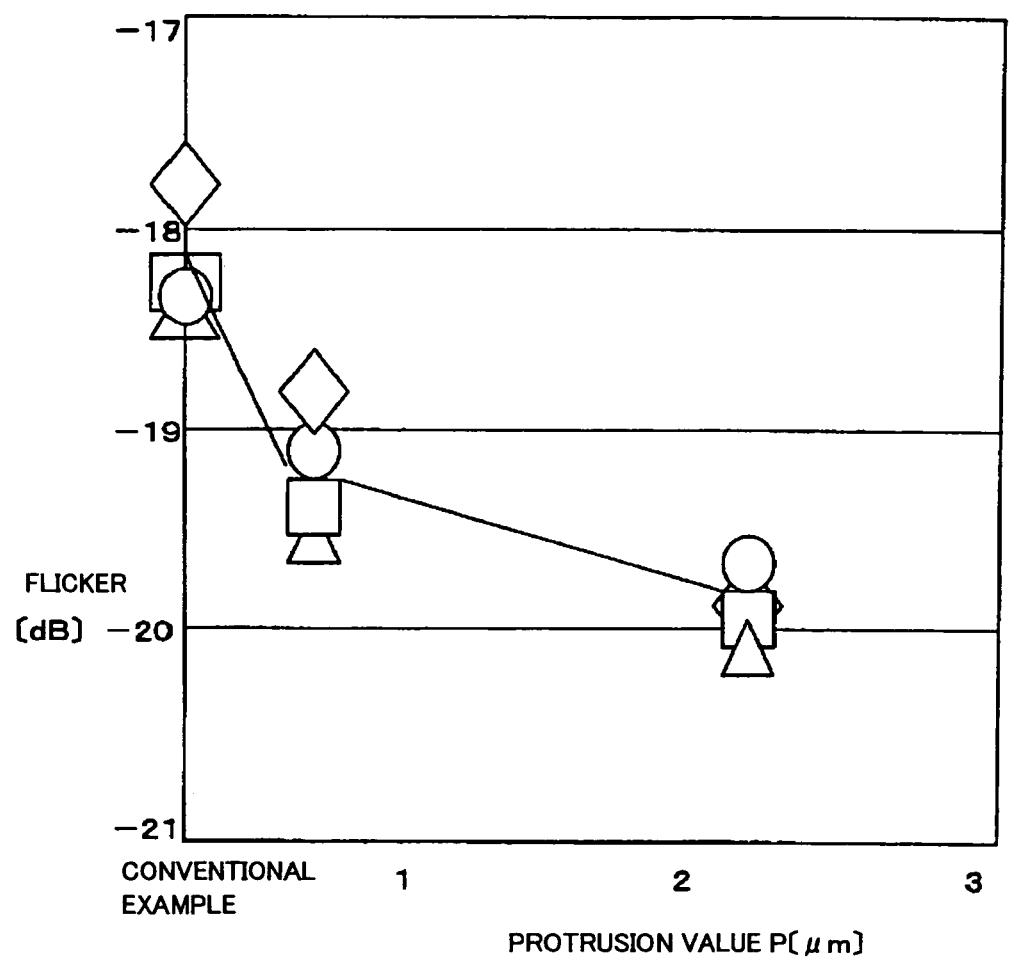
FIG. 10 is a graph illustrating how the degree of flicker on the image displayed by the electro-optical device changes in accordance with the change in the protrusion value P obtained by subtracting the width W2 of the data line from the width W1 of the nitride film and dividing the resultant by two.

According to the above exemplary embodiment, as illustrated in FIG. 10, it is possible to reduce flicker on an image. FIG. 10 is a graph illustrating how the degree of the flicker on the image displayed by the electro-optical device changes in accordance with the change in a protrusion value P=(W1−W2)/2. As illustrated in FIG. 10, the flicker on the image is reduced in the case where the nitride film 401, according to the present aspect, is formed compared with the related art (the left axis of FIG. 10), that is, the case where the nitride film does not exist on the data line 6a. It is noted that the degree of reduction increases as the protrusion value P increases. That is, the flicker is reduced as the protrusion value P increases. This is because the incident light that passes through the side of the data line 6a is refracted by the refractive index unique to the nitride film 401, which is not apparent. That is, light incident on the relatively wider part of the nitride film 401 is refracted by the part thereby to change the traveling path thereof. Therefore, light supposed to be incident on the TFT 30 reaches other components thereby to reduce the amount of light incident on the TFT 30. As a result, light leak current is reduced thereby to reduce the flicker.

Furthermore, in any of the above cases, the width W1 of the nitride film 401 is larger than the width W2 of the data line 6a. It is possible to obtain the following effect in the step of manufacturing the nitride film 401 because W1>W2 or the protrusion value P has a value that is not 0. That is, according to the step of manufacturing the nitride film 401, an original film of the nitride film is formed over the entire surface of the substrate. The nitride film 401 is formed only on the data line 6a by performing photolithography and etching or on the data line 6a and around the image display region 10a by patterning on the nitride film. At this time, the data line 6a may be damaged by etching the nitride film. However, when the relationship of (the width W1 of the nitride film 401)>(the width W2 of the data line 6a) is satisfied, only the edges of the nitride film 401 are damaged by etching the nitride film. Therefore, according to the present exemplary embodiment, it is possible to provide an appropriately operable electro-optical device without eroding the data line 6a.

Figure 11:
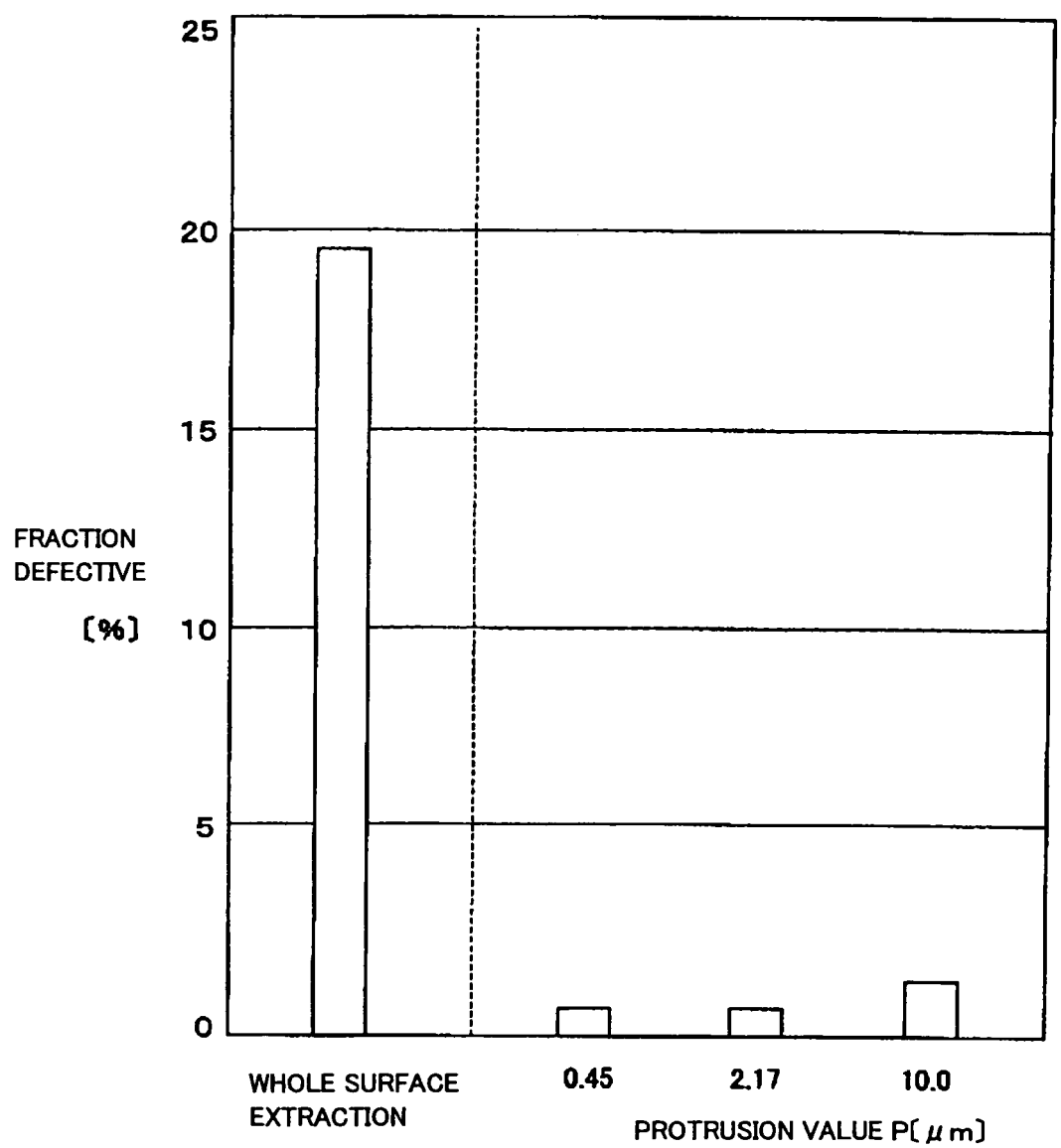
FIG. 11 is a graph illustrating the relationship among various patterned results having different shapes and the fraction defective of the electro-optical devices manufactured in accordance with the patterned results.

FIG. 11 illustrates an experiment result that clarifies the above. FIG. 11 is a graph illustrating the fraction defectives of the electro-optical devices as a result of performing various kinds of patterning with different shapes using photolithography after forming the original film of the nitride film over the entire surface of the TFT array substrate 10. The "fraction defective" refers to a fraction of the number of electro-optical devices that do not normally operate due to damaged data lines 6a to the total number of actually manufactured electro-optical devices. The "various kinds of patterning with different shapes" refer to three kinds of patterning where the protrusion values P are respectively 0.45 µm, 2.17 µm, and 10 µm. As apparent from FIG. 11, the fraction defective is close to 20% as a result (the left-most side of FIG. 11) of patterning to etch the entire nitride film while leaving only the rectangular part therearound. Compared with this, the fraction defective is extremely small as a result of leaving the nitride film 401 on the data line 6a and patterning the nitride film 401 so that the width W1 of the nitride film 401 is larger than the width W2 of the data line 6a. As mentioned above, it is possible to provide the exactly operable electro-optical device by making W1 larger than W2.

Figure 12:
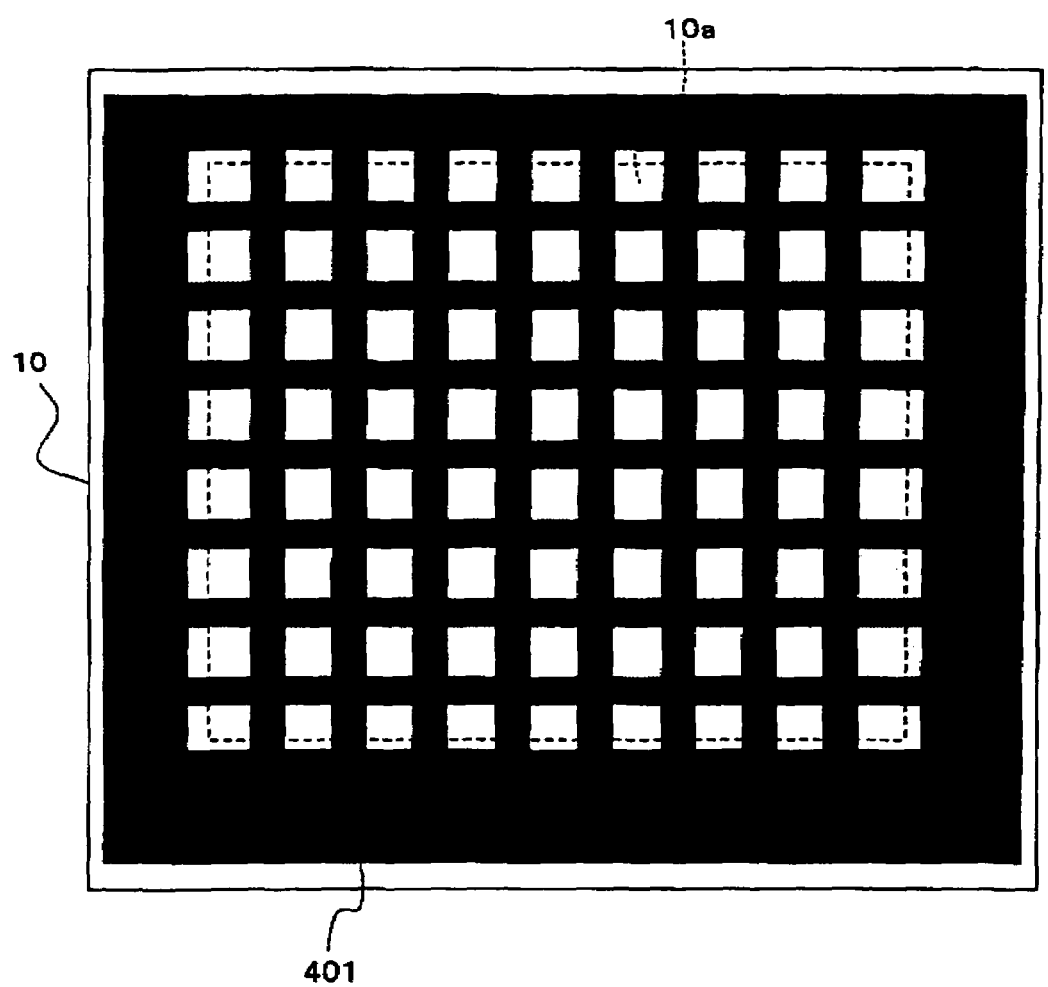
FIG. 12 is for the same purpose as FIG. 7 and illustrates a different aspect, where the nitride film is formed (on the data lines, out of the image display region, and on the scanning lines) from that of FIG. 7.

In the second exemplary embodiment, the nitride film 401 is formed on the data line 6a and around the image display region 10a. However, according to the present invention, the nitride film 401 may be formed along the scanning line 3a in addition to the above. Therefore, as illustrated in FIG. 12, the nitride film 401 is latticed and the area thereof increases. As a result, it is possible to more effectively reduce or prevent the permeation of moisture.

Figure 13:
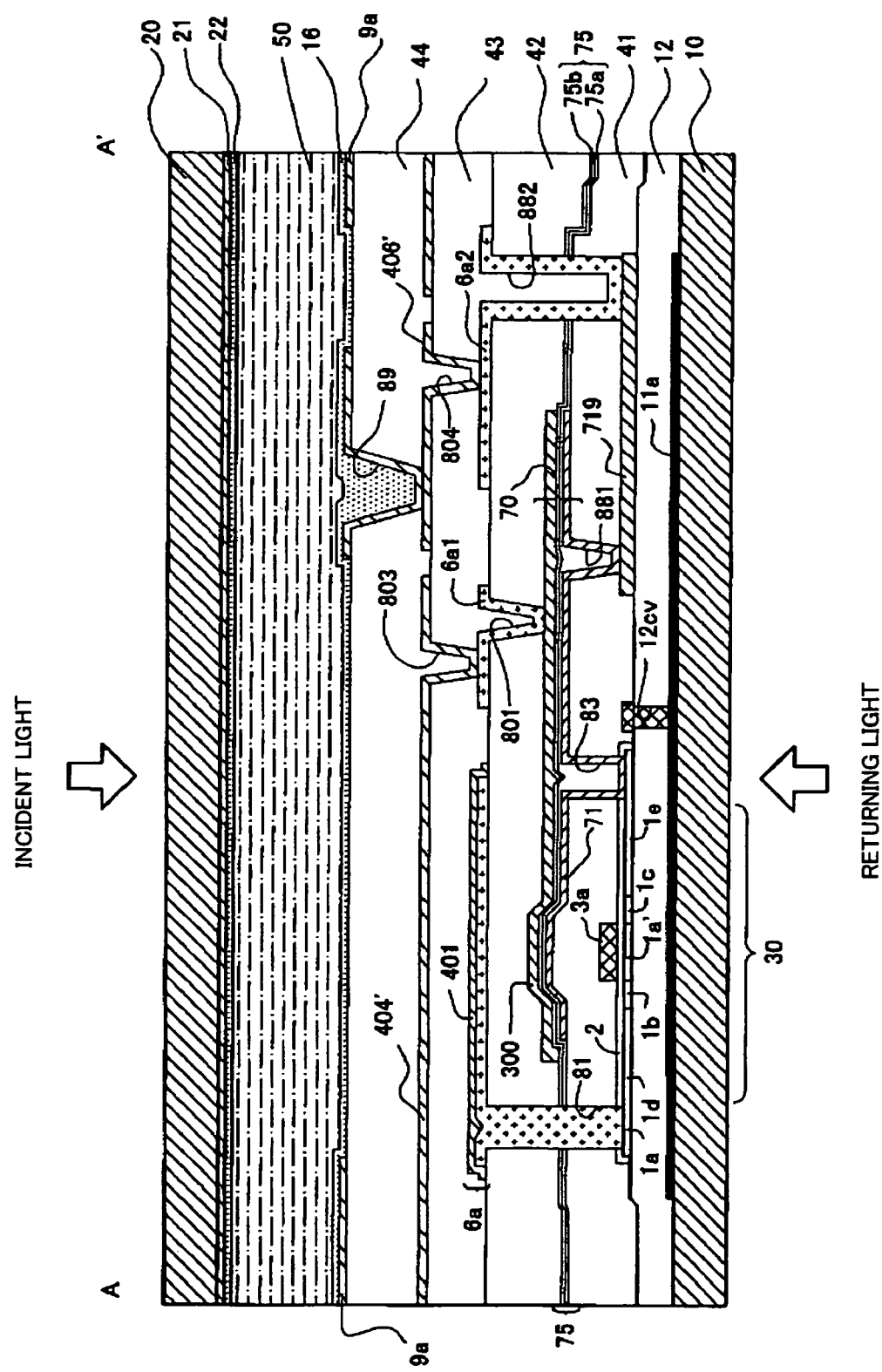
FIG. 13 is for the same purpose as FIG. 6 and illustrates a modification of the shielding layer.

Further, in the second exemplary embodiment, the shielding layer 404 is formed along the data line 6a. However, the present invention is not limited thereto. For example, as illustrated in FIG. 13, a shielding layer 404' made of a transparent conductive material, such as ITO and IZO may be formed over the entire surface of the TFT array substrate 10. Referring to FIG. 13, the shielding layer 404' is electrically connected to the capacitor electrode 300, which is not essential. Even if the shielding layer 404' is not electrically connected to the capacitor electrode 300, it is possible to separately connect both the shielding layer 404' and the capacitor electrode 300 to an electrostatic potential source and thereby to render both the shielding layer 404' and the capacitor electrode 300 to have a fixed potential.

According to the above configuration, the data line 6a is almost completely shielded from the pixel electrode 9a. Therefore, it is possible to more reliably exclude the influence of the capacitance coupling generated between the data line 6a and the pixel electrode 9a. Although the shielding layer 404' is formed in a mat shape, the light transmission in the electro-optical device does not deteriorate because the shielding layer 404' is formed of the ITO or the like.

Furthermore, the shielding layer 404' is preferably processed as mentioned below. First, the third relay layer 406 partitioned from the shielding layer 404' is formed of the same film as the shielding layer 400' in a region where the contact hole 804 is formed. Therefore, it is possible to insulate the shielding layer 404' having a fixed potential from the third relay layer 406. Another structure may be conceived. According to the structure, the third relay layer 406 as a lower layer of the shielding layer formed over the entire surface of the substrate may be formed in the region where the contact hole 804 is formed. A hole having an appropriate diameter may be formed in the shielding layer in the region where the contact hole 803 is to be formed. (The above structure is not illustrated.) By doing so, it is possible to easily form the contact hole 803 and the like. It is not necessary that the hole be precisely formed because the "hole" is only for making the contact hole (A "large hole" may work.). Second, the thickness of the shielding layer 404' is preferably about 50 to 500 nm. By doing so, it is enough to exclude the influence of the capacitance coupling and to reduce or prevent the shielding layer 404' from deteriorating the transparency of the electro-optical device.

Figure 14:
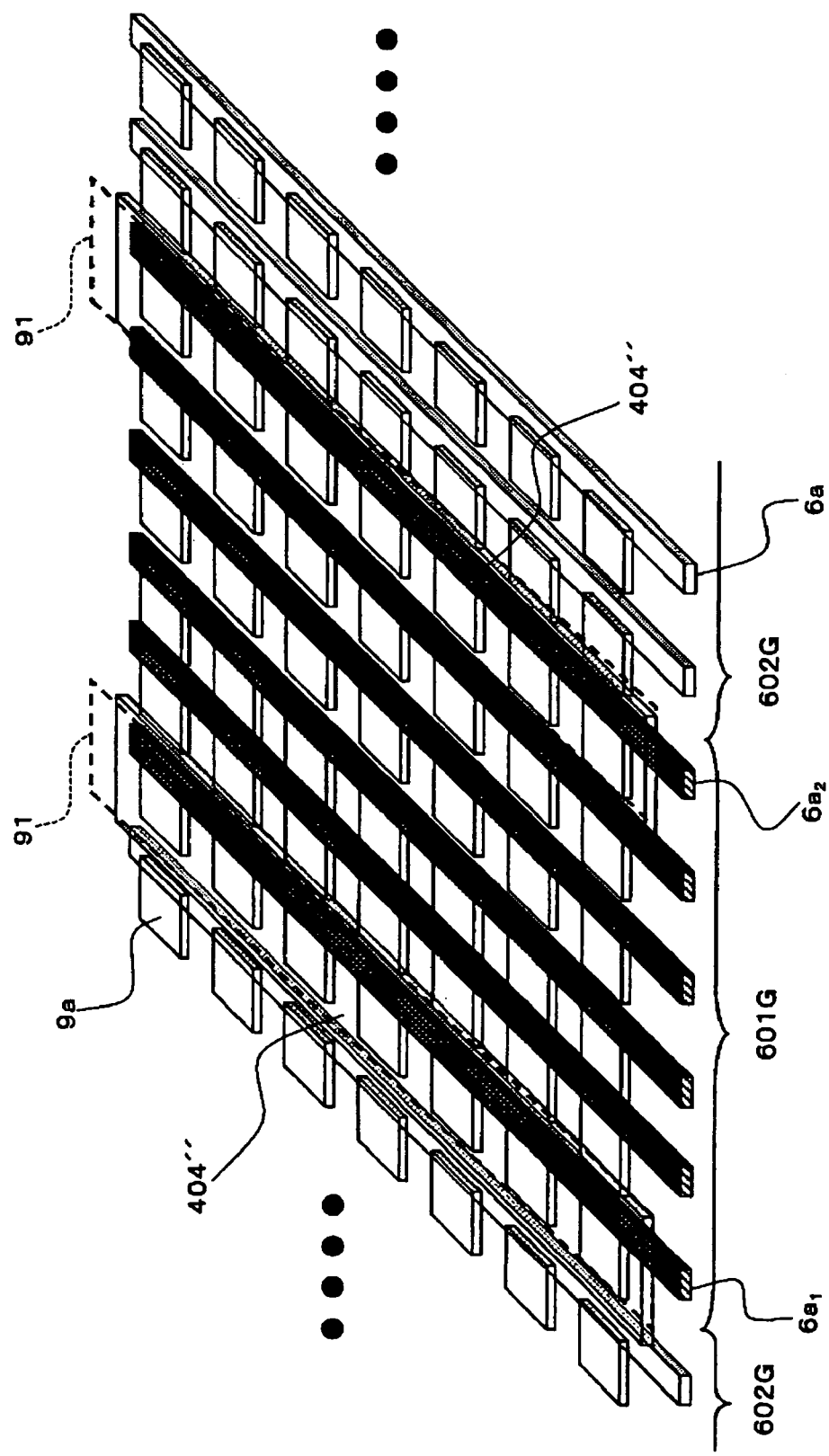
FIG. 14 is a perspective view of principal parts, which illustrates an aspect where the shielding layers are formed in the data lines on the boundary of supplied groups among the plurality of data lines.

According to the present invention, as mentioned above, the shielding layer is formed along the data line 6a and wider than the data line 6a so as to cover the data line 6a. Furthermore, it is possible to properly select the data line 6a, along which the shielding layer is to be formed. That is, as illustrated in FIG. 14, the shielding layers 404' are formed along the data lines on both ends of a group of data lines, to which image signals are simultaneously supplied, among the plurality of data lines.

According to the above configuration, in which the data lines 6a are divided into several groups and the image signals are simultaneously supplied to the groups, the shielding layers 404' are formed along the data lines most desired not to be affected by the capacitance coupling. Therefore, it is possible to more effectively enhance the quality of an image.

In general, the image signals are simultaneously supplied to a group of the plurality of data lines 6a. In the above case, the irregularity in the display of the image is caused along the data lines $6a_1$ and $6a_2$ that extend on the boundary between the group 601G (hereinafter, referred to as a "supplied group"), to which the image signals are actually supplied, and the group 602G (hereinafter, referred to as a "non-supplied group") adjacent thereto.

Figure 15:
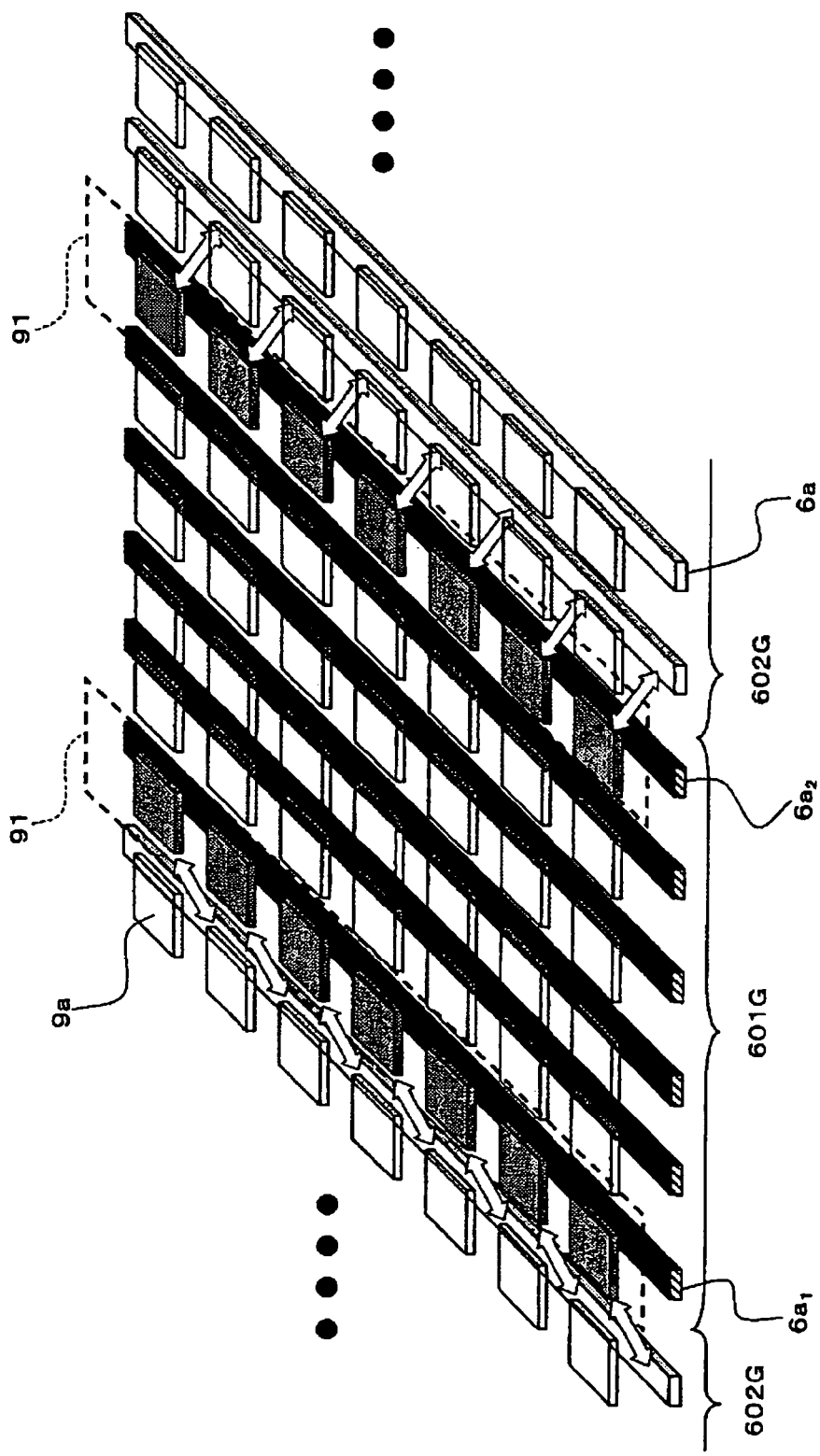
FIG. 15 is for the same purpose as FIG. 14 and conceptually illustrates the capacitance coupling generated between the data lines on the boundary of the supplied groups and the pixel electrodes.

This is because the electric field exactly corresponding to the image signal is not applied to the pixel electrode 9a on the boundary between the supplied group 601G and the non-supplied group 602G. More specifically, in the above case, as illustrated in FIG. 15, the data lines $6a_1$ and $6a_2$, to which the image signals are supplied, exist on one end of the pixel electrodes 9a (the pixel electrodes 9a in dashed lines 91 in FIG. 15). The data lines 6a (the data line 6a around the left side of the data line $6a_1$ and the data line 6a around the right side of the data line $6a_2$ in FIG. 15), to which the image signals are not supplied, exist on the other end of the pixel electrodes 9a. Therefore, even if correct electric fields corresponding to the image signals are applied to the pixel electrodes 9a, the potential of the pixel electrodes 9a changes due to the influence of the capacitance coupling between the pixel electrodes 9a and the data lines 6a, to which the image signals are not supplied. In FIG. 15, arrows on both directions are illustrated between the pixel electrodes 9a and the data lines in order to visually illustrate the above phenomenon.

In the present exemplary embodiment, it is possible to reduce or prevent the generation of display irregularity substantially along the data lines $6a_1$ and $6a_2$ that extend on the boundary by forming the shielding layers 400" along the data lines 6a on the boundary of the supplied group 601G as illustrated in FIG. 14.

The number of data lines which constitute the supplied group 601G is six in FIG. 14, but is basically determined by how many parallel signals form the image signals. For example, when it is assumed that the image signals are obtained by serial-parallel converting a serial signal into six parallel signals, the group of data lines includes six adjacent data lines.

Whole Configuration of Electro-Optical Device

The whole configuration of the electro-optical device for each of the exemplary embodiments will be described with reference to FIGS. 16 and 17. In addition, FIG. 16 is a plan view illustrating the TFT array substrate in the electro-optical device of the exemplary embodiment according to the present invention and the constituents formed thereon as viewed from the substrate side, and FIG. 17 is a cross sectional view along the plane H-H' in FIG. 16.

Figure 16:
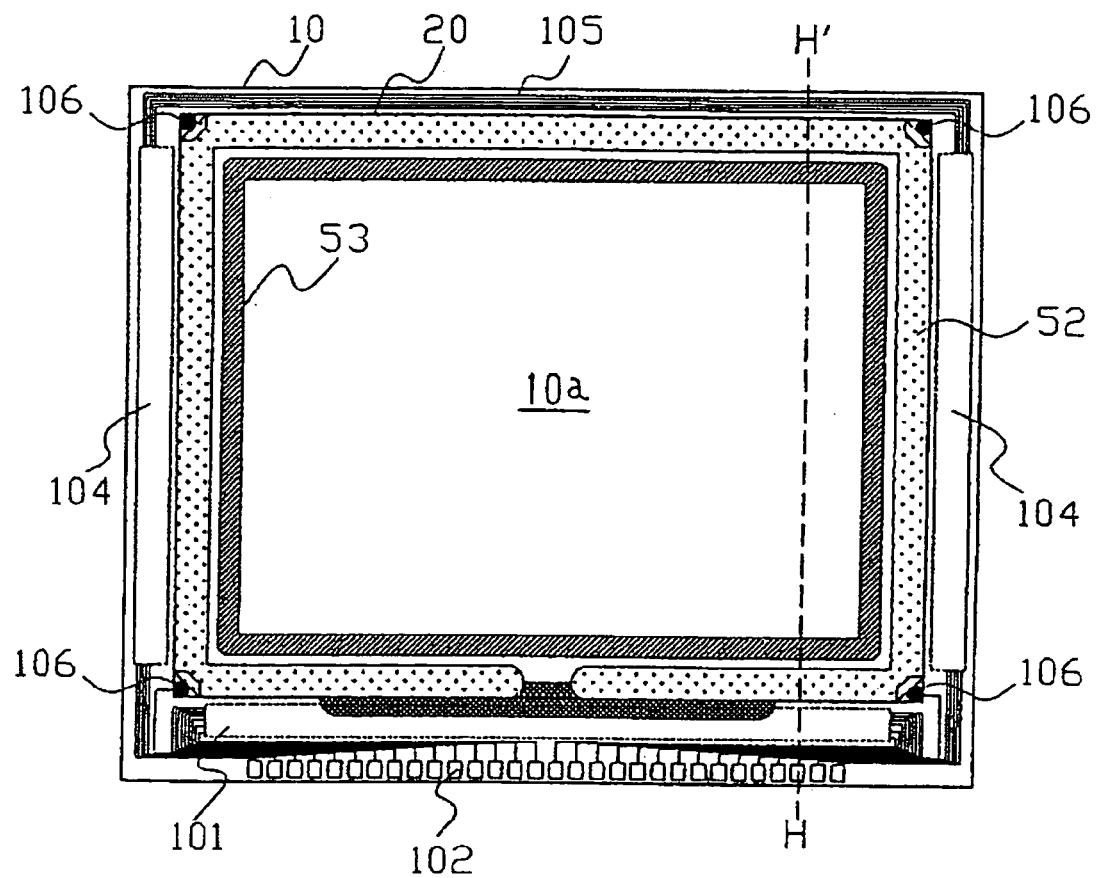
FIG. 16 is a plan view illustrating the TFT array substrate in the electro-optical device according to the present invention together with the respective components formed on the TFT array substrate as viewed from a counter substrate.
Figure 17:
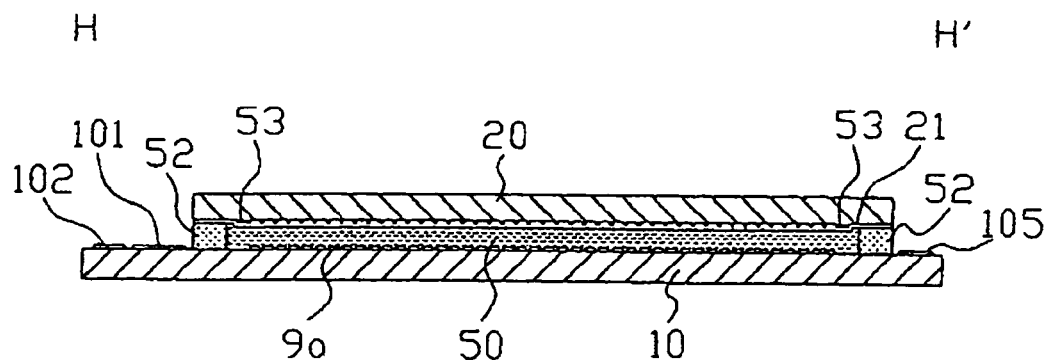
FIG. 17 is a cross sectional view taken along the plane H-H' of FIG. 16.

In FIGS. 16 and 17, with regard to the electro-optical device according to the present invention, the TFT array substrate 10 and the counter substrate 20 are provided to face each other. Between the TFT array substrate 10 and the counter substrate 20, liquid crystal layers 50 are sealed, and the TFT array substrate 10 and the counter substrate 20 are attached to each other with sealing materials 52 which are provided at the sealing regions where are located at the image display regions 10a.

The sealing materials 52 are made of, for example, a ultra-violet curing resin or a thermosetting resin for attaching both substrates to each other and are cured by ultra-violet irradiation, heating, etc. Furthermore, among the sealing materials 52, gap materials (spacers), such as glass fibers or glass beads, may be dispersed in order to keep the distance (the gap between the substrates) between both substrates in a predetermined value if the liquid crystal device in the exemplary embodiments is a small liquid crystal device with a function of displaying enlarged images, such as a projector. In addition, the gap materials may be included in the liquid crystal layer 50 if the liquid crystal device is a large liquid crystal device with a function of displaying images in the equal magnification power, such as liquid crystal display and liquid crystal television.

In the outside regions of the sealing materials 52, a data line driving circuit 101 which drives the data lines 6a by supplying the image signals to the data lines 6a at a predetermined timing and an external circuit connection terminals 102 are provided along the one side of the TFT array substrate 10, and scanning line driving circuits 104 which drive the scanning lines 3a by supplying the scanning signals to the scanning lines 3a at a predetermined timing are provided along the two sides which are adjacent to the one side.

In addition, as long as the delay of the scanning signals supplied to the scanning lines 3a is considered to be a problem, the scanning line driving circuits 104 may be also be provided at only one side. Furthermore, the data line driving circuit 101 may be provided at both sides along the one side of the image display regions 10a.

In the other side of the TFT array substrate 10, a plurality of wiring lines 105 is provided to connect the scanning line driving circuits 104 which are provided at both sides of the image display regions 10a.

Furthermore, in at least one position of the corner parts of the counter substrate 20, a conductive material 106 is provided to perform electrical conduction between the TFT array substrate 10 and the counter substrate 20.

In FIG. 17, on the TFT array substrate 10, alignment films are provided over the pixel switching TFTs or the pixel electrodes 9a after forming the wiring lines such as scanning lines, data lines, or the like. On the other hand, on the counter substrate 20, alignment films as well as the counter electrodes 21 are provided on portions of the uppermost layer. Furthermore, the liquid crystal layer 50 includes, for example, one type liquid crystal or a mixture of various types of liquid crystals, and takes predetermined alignment states between a pair of the alignment films.

In addition, on the TFT array substrate 10, a sampling circuit to apply the image signals to the plurality of the data lines 6a in a predetermined timing, a precharge circuit to supply precharge signals of a predetermined voltage level to the plurality of the data lines 6a in advance of the image signals, and a test circuit to check the quality, defects, etc., of the electro-optical device during the manufacturing stage or at the shipment stage in addition to the data line driving circuit 101, the scanning line driving circuits 104, etc., may be provided.

Electronic Apparatus

Next, with regard to an exemplary embodiment of a projection type color display device as an example of the electronic apparatus for which the electro-optical device described above in details is used as a light valve, the whole configuration, and particularly the optical configuration will be described. Herein, FIG. 18 is a schematic cross sectional view of the projection type color display device.

Figure 18:
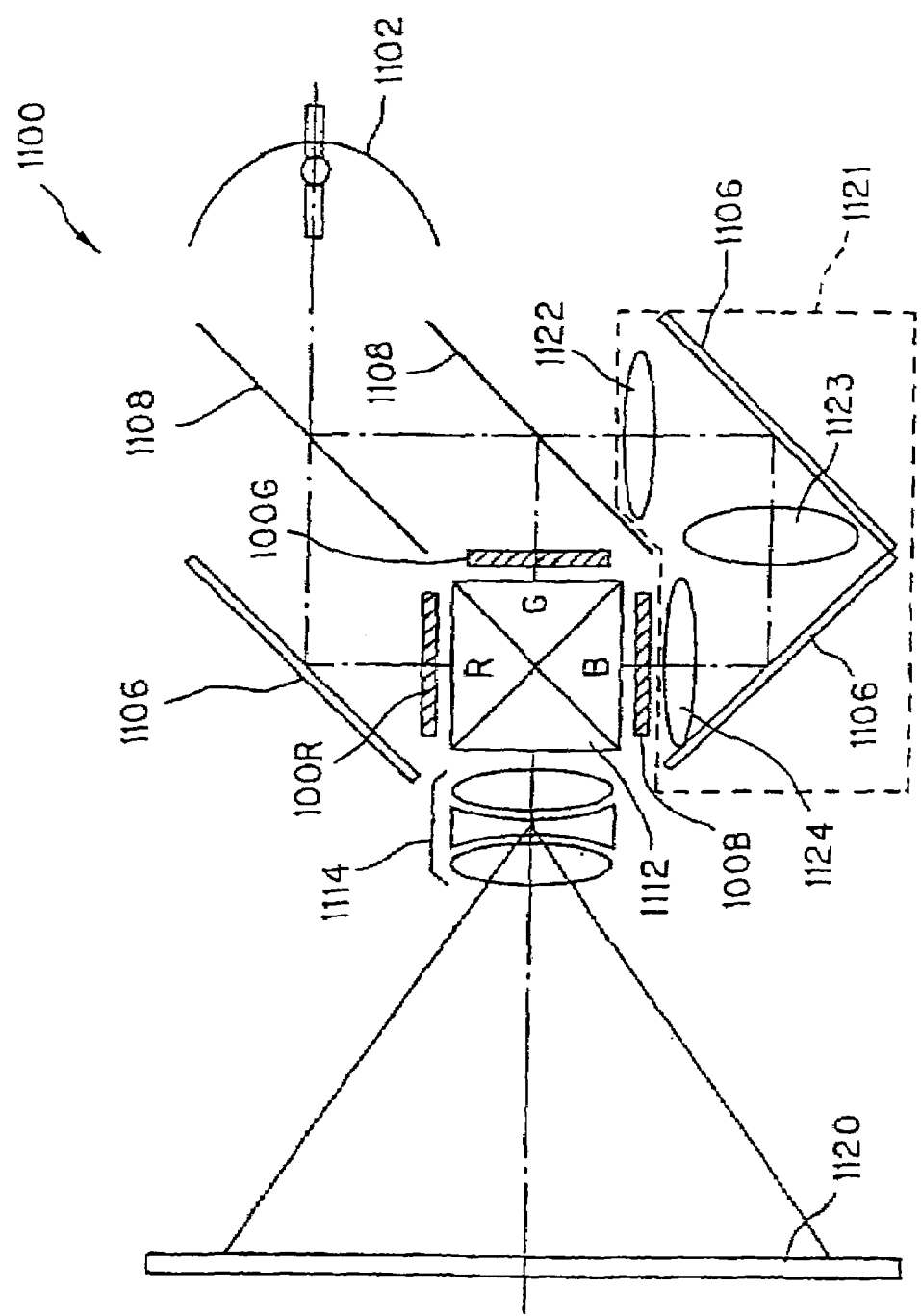
FIG. 18 is a schematic sectional view illustrating a color liquid crystal projector that is an example of a projection type color display device that is an electronic apparatus according to an aspect of the present invention.

In FIG. 18, the liquid crystal projector 1100 as an example of the projection type color display device according to the exemplary embodiment is provided with three liquid crystal modules which include liquid crystal devices in which driving circuits are mounted on the TFT array substrate, and is constructed as a projector which is used as RGB light valves 100R, 100G, and 100B, respectively. In the liquid crystal projector 1100, when the projection light is emitted from the a lamp unit 1102 of a white light source, such as a metal halide lamp, etc., the light is divided into light components R, G, and B corresponding to the three primary colors of RGB by three pieces of mirrors 1006 and two pieces of dichroic mirrors 1108, and then guided to the light values 100R, 100G, and 100B corresponding to each color. At this time, particularly, the B light is guided through relay lens system 1121 which includes an incident lens 1122, a relay lens 1123, and an emitting lens 1124 in order to reduce or prevent light leakage due to long light paths. In addition, the light components corresponding to the three primary colors which are modulated by the light valves 100R, 100G, and 100G, respectively, are combined again by a dichroic prism 1112, and then projected as a color image on a screen 1120 through the projection lens 1114.

The present invention is not limited to the aforementioned exemplary embodiments, and can be appropriately modified without departing from the principle or sprit of the invention drawn out from the claims and the whole specification, and any electro-optical device and electronic apparatus involved in the modifications are also included into the technical scope of the present invention. The electro-optical device can be adapted to an electrophoresis device, an electroluminescent device, or a device using electron emitting elements (a field emission display and a surface-conduction electron-emitter display).

What is claimed is:

1. An electro-optical device comprising, above a substrate:
    a data line extending in a first direction;
    a scanning line extending in a second direction that intersects the data line;
    a pixel electrode and a thin film transistor disposed so as to correspond to an intersection region of the data line and the scanning line;
    a shielding layer disposed between the data line and the pixel electrode, the shielding layer being applied with a fixed electric potential, the shielding layer including a titanium nitride film, being formed following the data line, and being wider than the data line so as to cover the data line; and
    a second nitride film formed on a top surface and a side surface of the data line.

2. The electro-optical device according to claim 1, an interlayer insulating film being arranged as the base of the pixel electrode, the interlayer insulating film having a surface subjected to a planarization process.

3. The electro-optical device according to claim 1, further comprising a storage capacitor electrically connected to the thin film transistor and the pixel electrode, the storage capacitor including a pair of electrodes, the data line being formed of the same layer as one of a pair of electrodes of the storage capacitor.

4. The electro-optical device according to claim 3, the data line configuring a laminated structure of an aluminum film and a conductive polysilicon film.

5. The electro-optical device according to claim 4, further comprising:
    a relay layer provided as part of the laminated structure, the relay layer electrically connecting the pixel electrode and one of the pair of electrodes of the storage capacitor.

6. The electro-optical device according to claim 5, the relay layer being made of an aluminum film and a nitride film.

7. The electro-optical device according to claim 5, the shielding layer being formed of the same layer as the relay layer.

8. An electronic apparatus characterized by being provided with the electro-optical device of claim 1.

9. The electro-optical device according to claim 1, the second nitride film having a narrower width than the shielding layer and being arranged with edges inward of edges of the shielding layer.

\* \* \* \* \*